(12) United States Patent
Hsu

(10) Patent No.: US 7,311,986 B2
(45) Date of Patent: Dec. 25, 2007

(54) MULTI-FUNCTION ENERGY SYSTEM OPERABLE AS A FUEL CELL, REFORMER, OR THERMAL PLANT

(75) Inventor: Michael S. Hsu, Lincoln, MA (US)

(73) Assignee: Ztek Corporation, Woburn, MA (US)

( * ) Notice: Subject to any disclaimer, the term of this patent is extended or adjusted under 35 U.S.C. 154(b) by 677 days.

(21) Appl. No.: 10/415,453

(22) PCT Filed: Oct. 30, 2001

(86) PCT No.: PCT/US01/48813

§ 371 (c)(1),
(2), (4) Date: Oct. 2, 2003

(87) PCT Pub. No.: WO02/059987

PCT Pub. Date: Aug. 1, 2002

(65) Prior Publication Data

US 2004/0058230 A1    Mar. 25, 2004

Related U.S. Application Data

(60) Provisional application No. 60/244,257, filed on Oct. 30, 2000.

(51) Int. Cl.
| | |
|---|---|
| H01M 8/18 | (2006.01) |
| H01M 8/04 | (2006.01) |
| H01M 8/10 | (2006.01) |
| H01M 2/00 | (2006.01) |
| H01M 4/00 | (2006.01) |

(52) U.S. Cl. .............. 429/20; 429/22; 429/24; 429/25; 429/26; 429/31; 429/34; 429/40

(58) Field of Classification Search .............. 429/12, 429/20, 22, 23, 24, 25, 26, 27, 31, 32, 34, 429/40
See application file for complete search history.

(56) References Cited

U.S. PATENT DOCUMENTS

| | | |
|---|---|---|
| 3,644,092 A | 2/1972 | Campbell |
| 4,522,894 A | 6/1985 | Hwang et al. |
| 5,338,622 A | 8/1994 | Hsu et al. |
| 5,366,821 A | 11/1994 | Merritt et al. |
| 5,498,487 A | 3/1996 | Ruka et al. |

(Continued)

FOREIGN PATENT DOCUMENTS

EP    0 423 905 A2    4/1991

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano, Esq.

(57) ABSTRACT

An energy system including a converter disposed within a collection vessel for collecting exhaust generated by the converter for delivery, if desired, to a bottoming device, such as a gas turbine assembly. The converter can be operated as a reformer. The chemical converter may also be operated as an electrochemical device. When the converter is operated as a fuel cell, electrical energy is generated when supplied with hydrogen or a hydrocarbon fuels. When operated as an electrolytic cell, the electrical energy is consumed for the production of chemical feed stocks or media for storage. The energy system can also include or be used as a thermal plant for producing pressurized, superheated vapor, or a hot thermal fluid or gas medium for commercial, industrial or power generation uses.

181 Claims, 14 Drawing Sheets

U.S. PATENT DOCUMENTS

| | | |
|---|---|---|
| 5,858,314 A | 1/1999 | Hsu et al. |
| 5,948,221 A | 9/1999 | Hsu |
| 5,976,332 A | 11/1999 | Hsu et al. |
| 6,054,229 A | 4/2000 | Hsu et al. |
| 6,083,636 A | 7/2000 | Hsu |

MULTI-FUNCTION ENERGY SYSTEM OPERABLE AS A FUEL CELL, REFORMER, OR THERMAL PLANT

RELATED APPLICATIONS

This application is a 35 U.S.C. §371 filing of International Application Number PCT/US01/48813 filed 30 Oct. 2001. The contents of the aforementioned application are hereby incorporated by reference.

The present patent application is a continuation-in-part patent application of U.S. Provisional Patent Application Ser. No. 60/244,257, filed Oct. 30, 2000, entitled CHEMICAL ENERGY POWER SYSTEM, the contents of which are herein incorporated by reference.

BACKGROUND OF THE INVENTION

The present invention relates to the construction of energy systems, and more specifically relates to high performance energy or power systems that employ chemical converters. The chemical converters may be electrochemical devices such as fuel cells or electrolyzers, or chemical devices such as reformers.

Electrochemical devices, such as fuel cells, convert chemical energy derived from fuel stocks directly into electrical energy. The key components in an electrochemical device are a series of electrolyte units having electrodes disposed over its surfaces, and a series of interconnectors disposed between the electrolyte units to provide serial electrical connections. The electrolyte units have fuel and oxidizer electrodes attached to opposite sides. Each electrolyte unit is an ionic conductor having low ionic resistance thereby allowing the transport of an ionic species from one electrode-electrolyte interface to the opposite electrode-electrolyte interface under the operating conditions of the converter. Various electrolytes can be used in such converters. For example, zirconia stabilized with such compounds as magnesia, calcia or yttria can satisfy these requirements when operating at an elevated temperature (typically around 1000° C.). The electrolyte material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface, which requires that the electrodes be sufficiently porous to admit the reacting gas species and to permit exit of product species. Electricity is generated through electrodes and the electrolyte by an electrochemical reaction that is triggered when a fuel, e.g., hydrogen, is introduced over the fuel electrode and an oxidant, e.g., air, is introduced over the oxidizer electrode. The electrochemical devices can also have a tubular or planar configuration.

Alternatively, the electrochemical devices can be operated in an electrolyzer mode, in which the electrochemical devices consume electricity and input reactants and produces fuel.

When an electrochemical device performs fuel-to-electricity conversion in a fuel cell mode, waste energy is generated and should be properly processed to maintain the proper operating temperature of the electrochemical device and to boost the overall efficiency of the power system. Conversely, when the device performs electricity-to-fuel conversion in the electrolyzer mode, the electrolyte must be provided with heat to maintain its reaction Furthermore, the device when used to reform fuel, requires the interchange of thermal energy. Thus thermal management of the electrochemical device for proper operation and efficiency is important.

Environmental and political concerns associated with traditional combustion-based energy systems, such as coal or oil fired electrical generation plants, are elevating interest in alternative energy systems, such as energy systems employing electrochemical devices. Nevertheless electrochemical devices have not found widespread use, despite significant advantages over conventional energy systems. For example, compared to traditional energy systems, electrochemical devices such as fuel cells are relatively efficient and do not produce pollutants. Accordingly, electrochemical energy systems can benefit from additional development to maximize their advantages over traditional energy systems and increase the likelihood of their widespread use.

Conventional energy devices, such as gas turbine power systems, exist and are known. Prior gas turbine power systems include a compressor, a combustor, and a mechanical turbine, typically connected in-line, e.g., connected along the same axis. In a conventional gas turbine, air enters the compressor and exits at a desirable elevated pressure. This high-pressure air stream enters the combustor, where it reacts with fuel, and is heated to a selected elevated temperature. This heated gas stream then enters the gas turbine and expands adiabatically, thereby performing work. One drawback of gas turbines of this general type is that the turbine typically operates at relatively low system efficiencies, for example, around 25%, with systems of megawatt capacity.

Thus, there exists a need in the art for high performance energy systems. In particular, an improved power system employing an electrochemical device and a conventional energy device that employs structure to increase operational efficiency while concomitantly enhancing system safety would represent a major improvement in the industry.

SUMMARY OF THE INVENTION

The present invention attains the foregoing and other objects by providing methods and apparatus for mounting a reformer, fuel cell and thermal control stack within a collection vessel, and for monitoring operational safety of the system. According to the invention, a chemical converter and a thermal control stack are coupled with a cogeneration or bottoming device, such as a gas turbine assembly, to form an energy system.

The energy system of the invention includes a collection vessel, one or more chemical converters disposed within the collection vessel, a thermal control stack in thermal communication with the chemical converter and disposed within the collection vessel, delivery means for delivering reactants to the chemical converter or the thermal control stack, and one or more sensors coupled to the collection vessel for monitoring a parameter of the system to ensure proper operation thereof.

According to one aspect, the system can include a gas sensor for sensing one or more constituents of the exhaust generated by the system. For example, the gas sensor can be an oxygen sensor for sensing the amount of oxygen within the exhaust.

According to another aspect, the sensor can be a UV or IR sensor for sensing a thermal condition of a component of the system, such as the thermal control stack.

According to another aspect, the system includes a mixer for mixing a reforming agent, such as steam, with an input fuel prior to introduction to a reformer.

According to another aspect, the chemical converter can be a fuel cell, reformer, or both. According to other aspects, the exhaust collected by the collection vessel can be coupled to a bottoming device, such as a gas turbine assembly.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
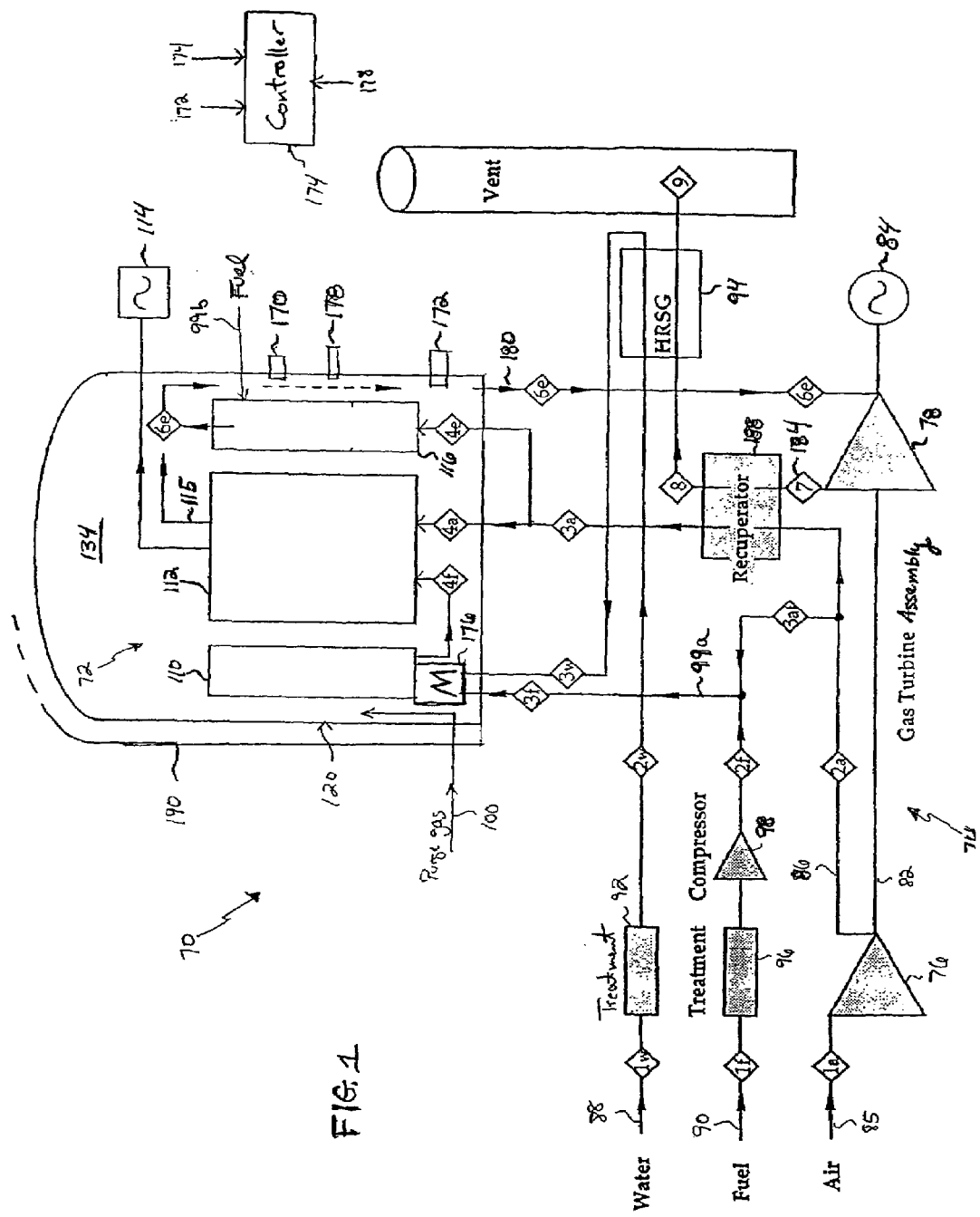
FIG. 1 is a schematic block diagram of one embodiment of a multifunction energy system mounting a reformer, fuel cell, and thermal control stack within a collection vessel and employing a plurality of sensors for ensuring operational safety of the system during use.

FIG. 1 shows one embodiment of an energy system 70 incorporating a chemical converter system 72 mounted within a collection vessel 120 and an optional bottoming device, such as a gas turbine assembly 74, according to the present invention. Those of ordinary skill will readily recognize that the bottoming device is an optional component of the present invention and need not be employed.

The gas turbine assembly extracts mechanical energy from waste heat from the exhaust generated by the chemical converter system 72. The gas turbine assembly 74 includes a compressor 76, a turbine expander 78, and a generator 84, all connected together by shaft 82. The shaft 82 can connect the compressor 76 to the turbine expander 78 in a serial in-line, aero-derivative configuration. The generator 84 is connected to the turbine expander 78 by any suitable coupling. The gas turbine assembly 74 typically operates on a hydrocarbon fuel, such as natural gas, methanol, kerosene, propane, gasoline, and diesel fuel, and inexpensively and cleanly generates electricity. Although the gas turbine assembly 74 illustrates the compressor 76, turbine expander 78, and the generator 84 mounted on the shaft 82 in sequential order, other orders can also be utilized. For example, the generator 84 can be disposed between the compressor 76 and the turbine expander 78. Further, the gas turbine assembly 74 can be arranged to include multiple shafts to form a multi-shaft assembly for generating electricity.

As used herein, the phrases gas turbine and gas turbine assembly are intended to encompass gas turbines of all power sizes, shapes and speeds, including microturbines operating at least at 50,000 RPM, and generally between about 70,000 and about 90,000 RPM. A suitable gas turbine can be obtained from Capstone Turbine Corporation of Tarzana, Calif. or from Allied Signal of Torrance, Calif.

As used herein, the phrase bottoming device is intended to include any suitable structure that can be coupled to the chemical converter system 72 or the collection vessel 120 and is adapted for receiving either exhaust or thermal energy therefrom. Examples of a suitable bottoming device include a gas turbine assembly, a steam turbine, other power systems and the like, or combinations thereof, or adapters suitable for the direct consumption of a conditioned thermal medium. As illustrated herein, the bottoming device is a gas turbine, although other types of systems can also be used.

An oxidizer reactant, such as oxygen or air 85, is introduced to the compressor 76 by way of any suitable fluid conduit, where it is compressed and heated, and then discharged therefrom. The heated, compressed and pressurized air 86 is then introduced to a heat exchanger 188, such as a recuperator, where it can be further heated by the turbine exhaust 184 exiting the turbine expander 78. Alternatively, a portion or all of the heated, pressurized air 86 can be intermingled with the fuel 90 and subsequently delivered to the chemical converter system 72 for reforming. Those of ordinary skill will recognize that any suitable number of fluid regulating devices can be employed in the illustrated system 70 to regulate one or more of the system fluids in order to regulate the delivery of fluids thereto or to adjust or regulate an operational parameter of one or more system components, such as the chemical converter system 72 and the gas turbine assembly 74.

As used herein, the terms heat exchanger or heat exchanging element are intended to include any structure that is designed or adapted to exchange heat between two or more fluids. Examples of suitable types of heat exchangers adapted for use with the present invention include recuperators, whether internally mounted in the gas turbine assembly 74 or mounted external thereof, radiative heat exchangers, counterflow heat exchangers, regenerative type heat exchangers and the like.

In the illustrated energy system 70, a reforming agent, such as water, and a fuel 90 are introduced to the chemical converter system 72. Specifically, the reforming agent 88 is initially passed through an optional pre-processing treatment stage 92 for removing unwanted ions, such as cations or anions, therefrom, as well as for filtering the water prior to introduction to the remainder of the system. The processed reforming agent is then transferred to a thermal energy source, such as a heat recovery steam generator (HRSG) 94, for converting the processed water to steam. The HRSG 94 employs the turbine exhaust exiting the recuperator 188 for heating the water to generate steam. The reforming agent is then introduced to the reformer 110 of the chemical converter system 72. The HRSG can be externally mounted, as shown, or can be mounted within the collection vessel 120. In this arrangement, the thermal energy necessary to convert the water to steam, or to heat air to the appropriate temperature if used as the reforming agent, can be provided by one or more components of the chemical converter system 72.

As used herein, the term reforming agent is intended to include any agent sufficient to convert or change, directly or indirectly, a first chemical species to another chemical species. Examples of reforming agents suitable for use in the present invention include water, air, carbon dioxide or a mixture thereof, which can be employed to convert the fuel in the presence of a chemical processor to reaction species, such as hydrogen and CO.

Likewise, a fuel reactant 90 passes through an optional preprocessing treatment stage 96, which can comprise a de-sulfurization unit, a steam reformer, and/or a shift reactor, for removing unwanted elements or impurities, such as sulfur compounds, from the fuel 90. The sulfur removal is important since the presence of unwanted sulfur in sufficient quantities may "poison" the fuel cell of the chemical converter system 72. Specifically, it is known that sulfur present in a fuel, such as hydrocarbon fuel, poisons the nickel catalyst of the fuel electrode present in the fuel cell by destroying its catalytic activity. This sulfur-sensitivity is present in both low and high temperature fuel cells. Those of ordinary skill will readily recognize that the fuel pre-processing can be performed at other locations within the system 70, or can be performed by the fuel cell of the chemical converter system 72 when passing therethrough. The processed fuel 99a is introduced to a compressor 98 where it is compressed. The processed fuel 99a can then be optionally mixed with the air reactant prior to introduction to the chemical converter system 72 in oxidation reforming regimes. In this embodiment, the air functions as the reforming agent, and hence the water 88 need not be employed. Furthermore, the processed fuel 99a can be optionally mixed with both air and water in the autothermal reforming process. The fuel and water or/and air can be introduced to the reformer 110 of the chemical converter system 72 to reform the fuel into a hydrogen-rich fuel.

The energy system 70 can further include an optional mixer 176 disposed within the collection vessel 120 and positioned to mix the processed fuel 99a and the water 88 in a steam reforming regime (or air 85 in oxidation reforming regime or both water and air in the autothermal reforming regime) prior to being introduced to the reformer 110. According to one practice, the reforming of hydrocarbon fuel can be conducted by reacting water, oxygen, carbon dioxide or their mixture with other suitable chemical species, such as described below and located within the reformer 110, to produce hydrogen and carbon monoxide. In the steam reforming process, the fuel can be heated by being mixed with the reforming agent (steam). Thus, the steam can be superheated prior to the point of mixture with the fuel in order to avoid accidentally condensing the steam when mixed with the cooler fuel. However, the mixer 176 avoids accidentally pyrolizing the fuel, which can result in unwanted carbon deposits, such as the type that can occur at temperatures of about 700° C. when utilizing natural gas. The illustrated mixer 176 achieves this by employing the liquid state of the steam (water) at the supply or mixing region prior to evaporation.

With reference to FIG. 1, the illustrated system 70 can include a collection vessel 120 for housing the chemical converter system 72. The chemical converter system 72 includes one or more chemical converters, such as a reformer 110, a fuel cell 112, and/or a thermal control stack 116. The illustrated reformer 110 is positioned within the collection vessel 120 so as to receive the processed reforming agent 88 and the processed fuel 90. The illustrated reformer 110 reforms the fuel in the presence of the reforming agent to produce a relatively pure fuel stock. Moreover, fuel cells utilize the chemical potential of selected fuel species, such as hydrogen or carbon monoxide molecules, to produce electrical power in addition to oxidized molecules. Since the cost of supplying molecular hydrogen or carbon monoxide is relatively higher than providing traditional fossil fuels, the reformer can be utilized to convert the fossil fuels, such as coal, natural gas, methanol, kerosene, propane, gasoline, and diesel fuel, to a reactant gas mixture high in hydrogen and carbon monoxide. Consequently, a fuel processor, either dedicated or disposed internally within the fuel cell, can be optionally employed to reform, by the use of steam, oxygen, or carbon dioxide (in an endothermic reaction), the fossil fuels into non-complex reactant gases.

Figure 2:
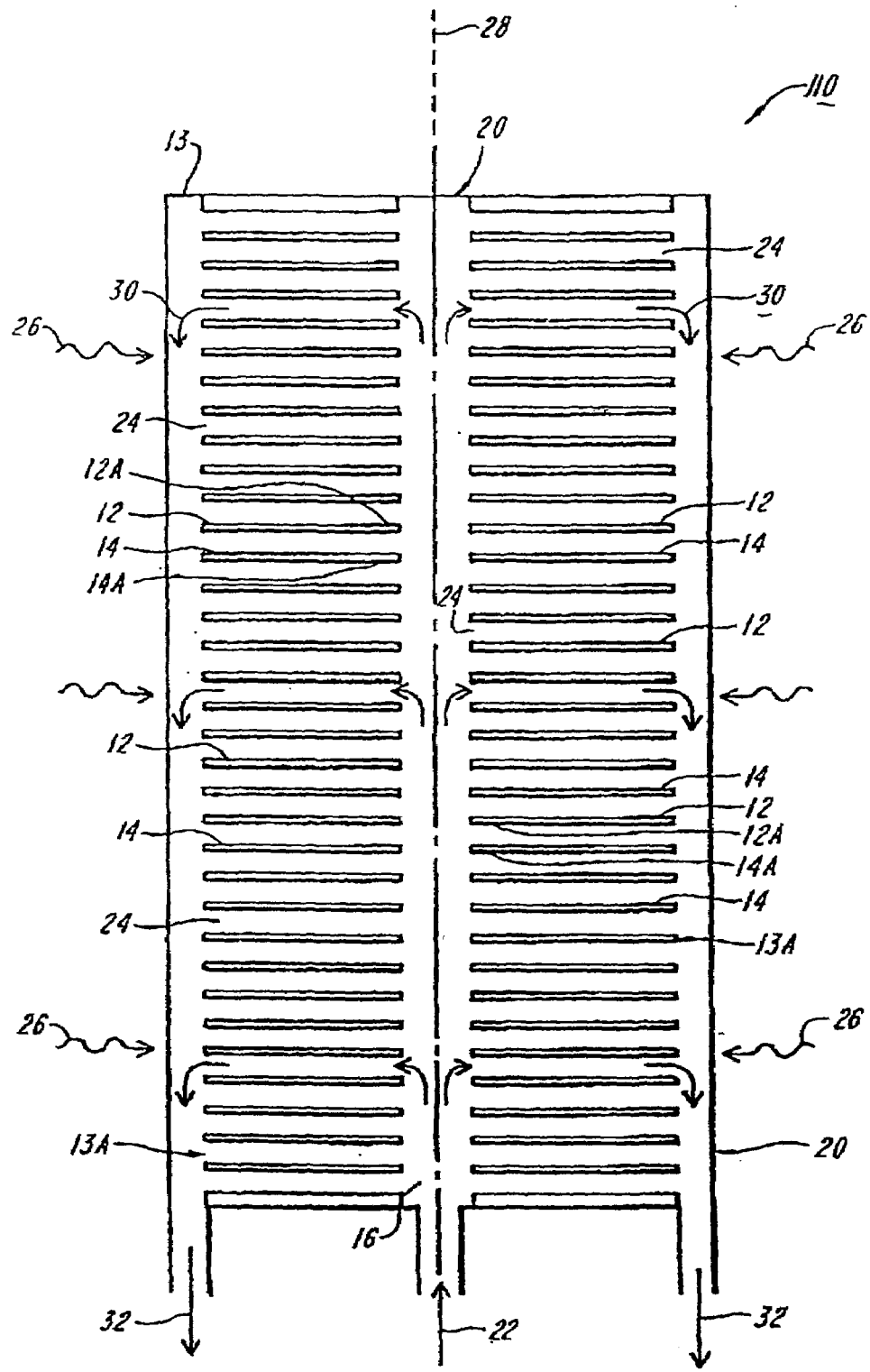
FIG. 2 is a cross-sectional view of one embodiment of a reformer used in a chemical converter system according to the teachings of the present invention.

FIG. 2 is a cross-sectional view of one embodiment of the reformer 110. The reformer 110 includes a number of thermally conductive plates 12 and reforming plates 14 that are alternately stacked together to form a stacked reforming structure 13 that extends along axis 28. The reformer includes a fluid conduit 16 that is in fluid communication with the inner portions 12A, 14A of the plates 12, 14. The reformer 110 is preferably housed within a gas-tight enclosure, housing or collection vessel 20, which can be the collection vessel 120 or distinct from the collection vessel 120. The illustrated reformer can be used to perform steam, oxidation or autothermal reforming. The heat necessary for the reforming process can be supplied internally by partial oxidation of hydrocarbon fuel or supplied externally by a remote heat source, as shown by wavy lines 26, to the reformer 110 by radiation, conduction or convection.

The reactant to be reformed by the reformer 110 is introduced thereto through the axial fluid manifold 16. The reactant preferably comprises a mixture of a hydrocarbon fuel and a reforming agent, such as air, oxygen, water, $CO_2$ or a mixture thereof, that are premixed either prior to introduction to the manifold 16 or within the reformer. The illustrated reformer 110 includes at least one manifold that delivers a fuel/reforming agent mixture to the reformer, rather than provide separate input manifolds for each gas constituent. The introduction of a premixed reactant to the reformer 110 provides for a relatively simple design.

The reactant mixture 22 is introduced to the manifold 16 by any appropriate means, such as by fluid conduits. The mixture 22 enters the inner portions of the reformer through reactant passages 24 that are formed between the adjacent conductive plates 12 and reforming plates 14. The passages can comprise any surface indentation or protrusions, which can be formed by embossing, and which constitutes a substantially continuous fluid passage that extends from the manifold 16 to the outer peripheral surface 13A of the stacked reforming structure 13. The passages can also be formed by utilizing conductive or reforming plates that are made of a porous material or have a power reformer catalyst material coated or formed thereon, thus allowing the reactant to pass through the reformer.

Figure 3A:
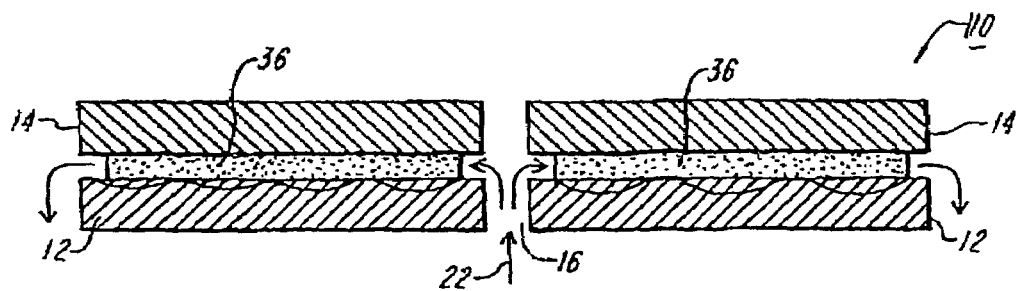
FIGS. 3A-3C are cross-sectional views of various embodiments of the catalyst and reforming plates of the reformer of FIG. 2.
Figure 3B:
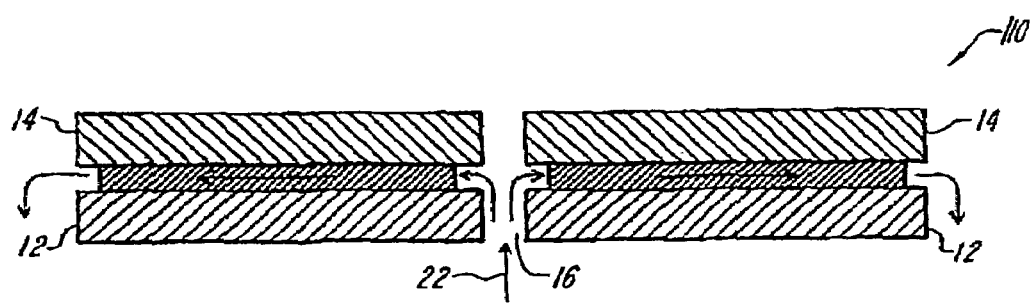
Figure 3C:
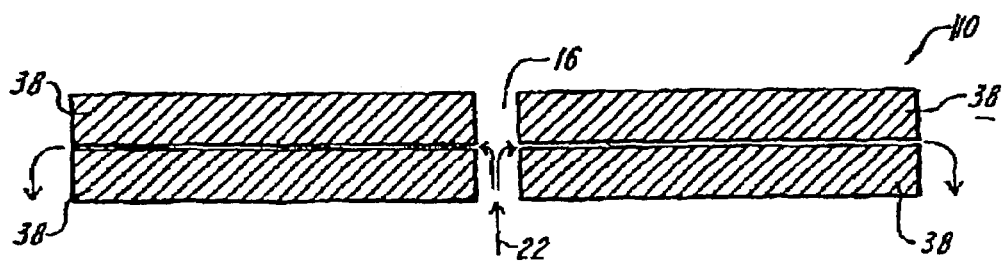

Examples of these various plate arrangements and configurations are illustrated in FIGS. 3A-3C. FIG. 3A illustrates the stacked arrangement of the reformer plates 14 and conductive plates 12. The reformer plates preferably have formed thereon a reformer catalyst material 36 that intimately contacts the conductive plate 12. The illustrated conductive plate 12 is embossed to form reactant flow channels. The input reactant or the reactant mixture 22 is introduced to the axial manifold 16 and enters the reactant channels, where it exits the stacked plate reformer at the peripheral edges thereof.

The reformer catalyst material can be composed of a solid or porous material. FIG. 3B illustrates the mixture flow through the reformer 110 when using a porous reforming material. The use of a porous reforming material relaxes the embossing requirements of the illustrated reformer.

In another embodiment, as illustrated in FIG. 3C, the reformer 110 includes a plurality of stacked plates 38 or simply a columnal structure that are formed of a composite of thermally conductive material and a reforming material. This composite plate 38 can be achieved by interspersing a suitably thermally conductive material in admixture with a suitable reforming material. The resultant stacked structure operates substantially identical to the stacked reforming structure 13 shown in FIGS. 2, 3A and 3B and described above.

Those of ordinary skill will recognize that other embodiments of the reformer 110 exists, such as where the reforming plates 14 are composed of a porous material and have a reforming catalyst material disposed therein or coated thereon. The use of porous materials is one of the advantages of the present external reformer since it relaxes the gas-tight requirements of the reforming system without sacrificing efficiency. Those of ordinary skill will also recognize that conventional type reactant bed reformers or non-plate type reformers can be used as part of the chemical converter system 72.

The reactant mixture is reformed within the stacked reforming structure 110 as the reactant passes through the reactant passages and over or through the reforming plates 14. The catalyst material associated with the reforming plates 14 promotes the reforming of the hydrocarbon fuel into simpler reaction species. The stream of reactant mixture introduced to the manifold 16 can comprise $H_2O$, $O_2$, and $CO_2$, in addition to a hydrocarbon fuel. For example, methane ($CH_4$) can be catalytically reformed into a mixture of hydrogen, water, carbon monoxide and carbon dioxide.

When operating the reformer as a steam reformer, it receives a reactant gas mixture containing natural gas (or methane), or vaporized kerosene, methanol, propane, gasoline, or diesel fuel, and steam. Steam reforming catalyst can be formed on the reformer plate in a circumferential band. Thermal energy for the reforming reaction is preferably conducted radially inward from the gas-tight enclosure by the conductive plates 12. The thickness and thermal conductivity of the conductive plates are selected to provide sufficient heat flow radially (or in-plane) to provide heat for the endothermic reforming reaction. The conductive plate can include an integral extension which protrudes into the axial reactant manifold 16 for preheating the incoming reactants, as described in further detail below.

When operating the reformer as a partial oxidation reformer or an autothermal reformer, it receives a reactant gas mixture containing natural gas (or methane), or vaporized kerosene, methanol, propane, gasoline, and diesel fuel, and air, oxygen or/and steam. One or more types of reforming catalyst material can be distributed in circumferential bands on the reformer plate.

The illustrated reformer 110 can be used to reform reactants such as alkanes (paraffin hydrocarbons), hydrocarbons bonded with alcohols (hydroxyls), hydrocarbons bonded with carboxyls, hydrocarbons bonded with carbonyls, hydrocarbons bonded with alkenes (olefins hydrocarbons), hydrocarbons bonded with ethers, hydrocarbons bonded with ester, hydrocarbons bonded with amines, hydrocarbons bonded with aromatic derivatives, and hydrocarbons bonded other organo-derivatives.

The reforming plate 14 can be composed of any suitable reforming catalytic material that operates at temperatures in the range between about 200° C. and about 800° C. Examples of the types of material that can be used include platinum, palladium, chromium, chromium oxide, nickel, nickel oxide, nickel containing compounds, and other suitable transition metals and their oxides. The reforming plate 14 can further include a ceramic support plate that has a reforming material coated thereon, as illustrated in FIGS. 3A and 3B. Thus, the reforming plate 14 of the present invention can include any multi-stacked reforming plate structure that includes suitable reforming catalysts that promote the reformation of a hydrocarbon fuel into suitable reaction species.

The conductive plate 12 can be formed of any suitable thermally conductive material, including metals such as aluminum, copper, iron, steel alloys, nickel, nickel alloys, chromium, chromium alloys, platinum, and nonmetals such as silicon carbide, and other composite materials. The thickness of the conductive plate 12 can be selected to maintain a minimum temperature gradient in-plane of the plate 12 and to thereby provide an isothermal region for optimum reforming reaction and to alleviate thermal stress in the reforming plates 14. The conductive plate 12 preferably forms a near isothermal condition in-plane of each plate 12. The isothermal surface formed by the conductive plate 12 improves the efficiency of the overall reforming process by providing a substantially uniform temperature and supply of heat over the surface of the plate for reforming.

Furthermore, the conductive plates form an isothermal condition along the axis of the stack (along the outer peripheral surface of the stacked reformer 13) by the uniform distribution of the reactant mixture through the reactant passages, thereby preventing cold or hot spots from developing along the stack. This improves the thermal characteristics of the reformer 110 and improves the overall performance of the system. As used herein, the term "isothermal" condition or region is intended to include a substantially constant temperature that varies only slightly in an axial or in-plane direction. A temperature variation of at least about 50 C. is contemplated by the teachings of the present invention.

The reformed fuel or reaction species is exhausted along the peripheral portion 13A of the stacked reforming structure 13, as indicated by the arrows 30. The peripheral exhausting of the reaction species, e.g., reformed fuel products allows relatively easy manifolding of the reactants. The exhausted fluid media are then collected by the gas-tight housing 20 and exhausted therefrom through exit conduits 32. The gas-tight housing 20 thus serves as a peripheral manifold.

In an alternate embodiment, the reactant mixture 22 can be introduced into the peripheral manifold formed by the housing 20 and then into the stacked reforming structure 13 along the peripheral edge. The reactant flows radially inward across the reforming and conductive plates 14, 12 and is discharged through the axial manifold 16.

The ability to vent the reformed reactant mixture at least at a substantial portion of the periphery of the stack, and preferably from nearly the entire periphery, provides for an exposed peripheral surface devoid of a gas-tight seal or insulating material. Hence, the reformer 110 of the present invention achieves a compact, simple, elegant reforming design.

The gas-tight enclosure 20 is preferably composed of a thermally conductive material, such as metal. In the illustrated embodiment, the gas-tight enclosure 20 radiantly receives heat energy from an external heat source and further radiantly transfers this heat energy to the stack 13 and thus to the conductive plates 12. The plates 12 supply the heat energy necessary for the reforming reaction by conductively transferring the heat from the outer peripheral surface 13A of the stack 13 inwardly towards the reactant manifold 16. Those of ordinary skill will recognize that the enclosure 20 can be separate from and disposed within the vessel 120 of FIG. 1.

In another embodiment, the outer surface of the reforming structure 110 contacts the inner surface of the gas-tight housing, which serves to conductively transfer the heat energy to the conductive plates.

The gas-tight enclosure of cylindrical configuration is particularly suitable for pressurized reformer operation. The pressure within the vessel is preferably between about ambient and about 50 atm, although other pressure regimes are contemplated by the present invention.

The technique for achieving axial reactant flow distribution uniformity is as follows. The reactant flow passages 24 are designed to ensure that the total reactant flow pressure drop in the reactant passages is significantly greater than or dominates the reactant flow pressure drop in the reactant manifold 16. More specifically, the flow resistance of the passages 24 is substantially greater than the flow resistance of the axial manifold 16. According to a preferred practice, the reactant flow pressure within the passages 24 is about ten times greater than the reactant flow pressure within the manifold. This pressure differential ensures an axial and azimuthal uniform distribution of reactant along the reactant manifold 16 and the reactant passages 24 and essentially from top to bottom of the reformer stack 13. The uniform flow distribution ensures a uniform temperature condition along the axis of the reforming structure 110.

According to a preferred embodiment, the stacked reforming structure 13 is a columnal structure, and the plates have a diameter between about 1 inch and about 20 inches, and have a thickness between about 0.002 inch and about 0.2 inch. The term columnal as used herein is intended to describe various geometric structures that are stacked along a longitudinal axis and have at least one internal reactant manifold which serves as a conduit for a reactant mixture.

Those of ordinary skill will appreciate that other geometric configurations can be used, such as rectangular or rectilinear shapes with internal or external manifolds. The plates having a rectangular configuration can be stacked and integrated with attached external manifolds for the supply and the collection of the reactant and reforming resultant species.

The relatively small dimensions of the plates 12, 14 of the reformer 110 provide for a compact plate-type reformer that reforms a hydrocarbon fuel into suitable reaction species, and which is easily integratable with existing power systems and assemblies. The illustrated reformer 110 can be thermally integrated with an electrochemical device or chemical converter, such as a solid oxide fuel cell. In the special application where the reformed fuel is introduced into the fuel cell, the required heat of reaction is supplied from the waste heat generated by the fuel cell.

Figure 4:
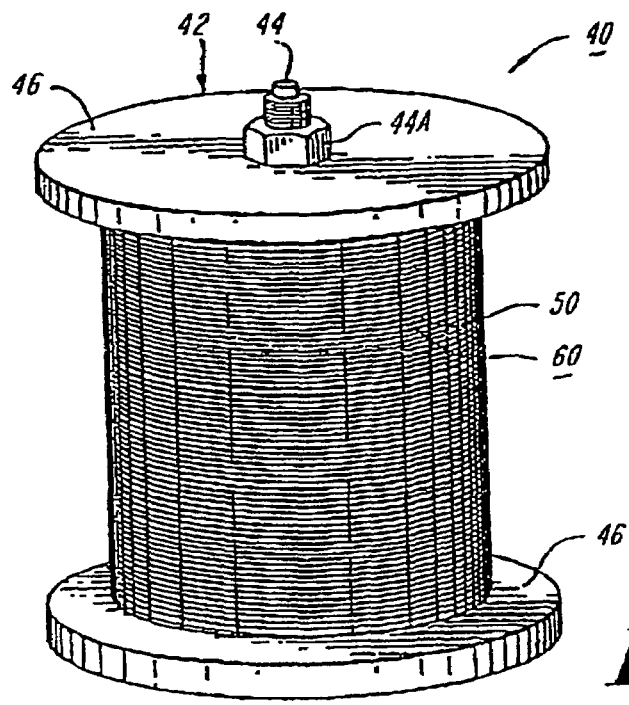
FIG. 4 is an isometric view of an assembled fuel cell converter with internal reforming according to the teachings of the present invention.

FIG. 4 shows an isometric view of a reformer incorporated internal to an electrochemical converter system according to a preferred embodiment of the invention. The internal reforming electrochemical converter 40 is shown consisting of alternating layers of an electrolyte plate 50 and an interconnector plate 60. The interconnector plate is typically a good thermal and electrical conductor. Holes or manifolds formed in the structure provide conduits for the fuel and oxidizer gases, e.g., input reactants. Reactant flow passageways formed in the interconnector plates, FIG. 5, facilitate the distribution and collection of these gases.

Figure 5:
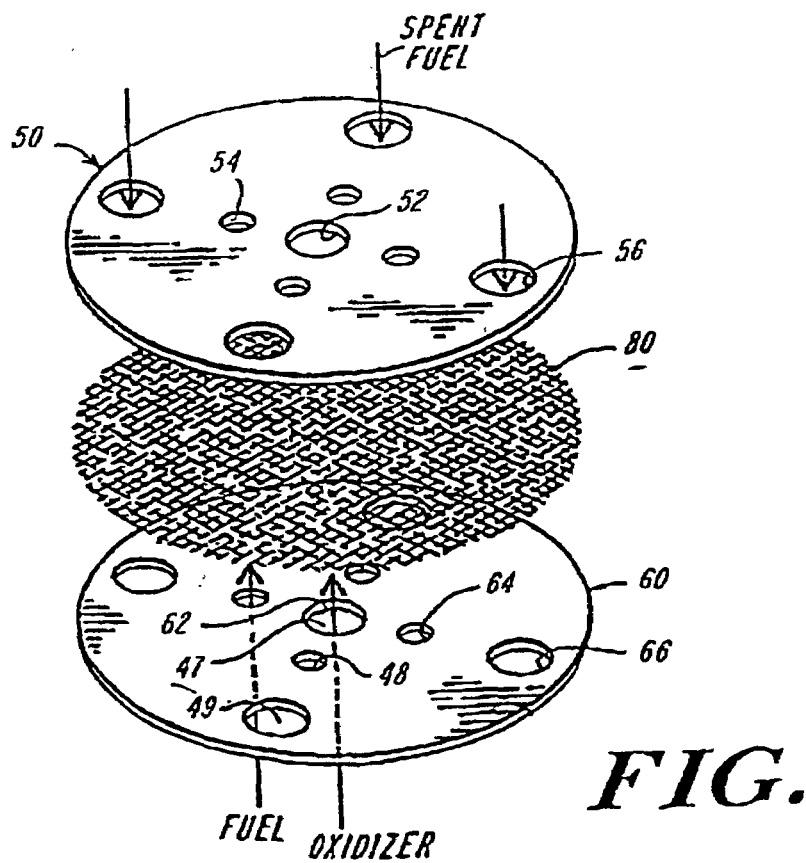
FIG. 5 is a more detailed isometric view of the electrolyte component and the interconnector component of a fuel cell converter allowing internal reforming.

The plates 50, 60 of the internal reforming electrochemical converter 40 are held in compression by a spring loaded tie-rod assembly 42. The tie-rod assembly 42 includes a tie-rod member 44 seated within a central oxidizer manifold 47, as shown in FIG. 5, that includes an assembly nut 44A. A pair of endplates 46 mounted at either end of the internal reforming electrochemical converter 40 provides uniform clamping action on stack of alternating interconnector and electrolyte plates 50, 60 and maintains the electrical contact between the plates and provides gas sealing at appropriate places within the assembly. The converter 40 can be the same as the converter 112 of FIG. 1.

Figure 6:
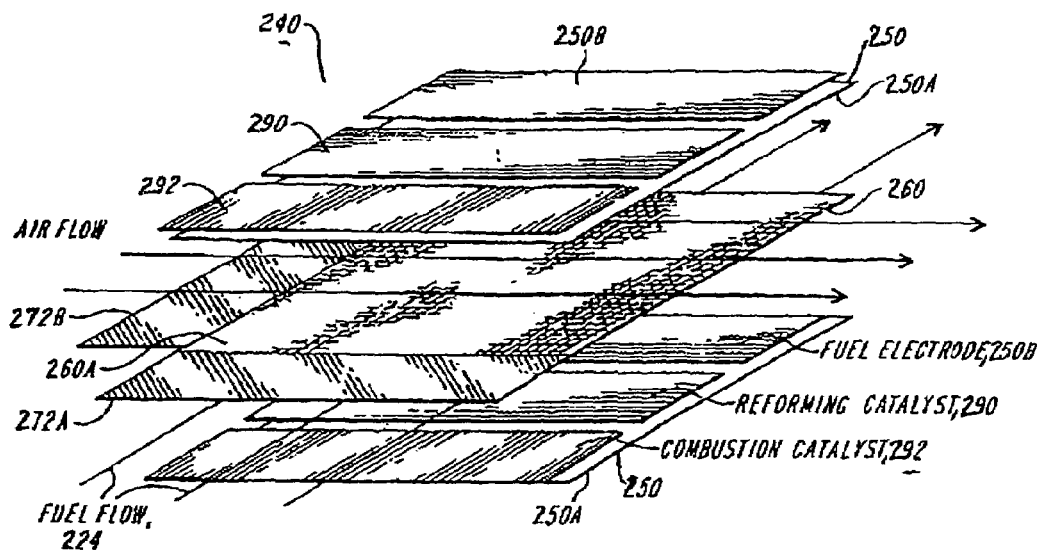
FIG. 6 is a cross-sectional assembled view of the electrolyte and interconnector components having various process bands disposed thereacross.

FIGS. 4 through 6 illustrate the basic cell unit of the electrochemical converter 40, which includes the electrolyte plate 50 and the interconnector plate 60. In one embodiment, the electrolyte plate 50 can be made of a ceramic material, such as a stabilized zirconia material $ZrO_2(Y_2O_3)$, an oxygen ion conductor, and a porous oxidizer electrode material 250A and a porous fuel electrode material 250B which are disposed thereon. Exemplary materials for the oxidizer electrode material are perovskite materials, such as $LaMnO_3$ (Sr). Exemplary materials for the fuel electrode material are cermets such as $ZrO_2/Ni$ and $ZrO_2/NiO$.

The interconnector plate 60 preferably is made of an electrically and thermally conductive interconnect material. The materials suitable for interconnector fabrication include metals such as aluminum, copper, iron, steel alloys, nickel, nickel alloys, chromium, chromium alloys, platinum, platinum alloys, and nonmetals such as silicon carbide, La(Mn)$CrO_3$, and other electrically conductive materials. The interconnector plate 60 serves as the electric connector between adjacent electrolyte plates and as a partition between the fuel and oxidizer reactants. Additionally, the interconnector plate 60 conductively transfers heat in-plane (e.g., across the surface) of the plate to form an isothermal surface, as described in further detail below. As best shown in FIG. 5, the interconnector plate 60 has a central aperture 62 and a set of intermediate, concentric radially outwardly spaced apertures 64. A third outer set of apertures 66 are disposed along the outer cylindrical portion or periphery of the plate 60.

The interconnector plate 60 can have a textured surface. The textured surface 260A preferably has formed thereon a series of dimples, which are formed by known embossing techniques and which form a series of connecting reactant flow passageways. Preferably, both sides of the interconnector plate have the dimpled surface formed thereon. Although the intermediate and outer set of apertures 64 and 66, respectively, are shown with a selected number of apertures, those of ordinary skill will recognize that any number of apertures or distribution patterns can be employed, depending upon the system and reactant flow and manifolding requirements.

Likewise, the electrolyte plate 50 has a central aperture 52, and a set of intermediate and outer apertures 54 and 56 that are formed at locations complementary to the apertures 62, 64 and 66, respectively, of the interconnector plate 60.

As shown in FIG. 5, a reactant flow adjustment element 80 can be interposed between the electrolyte plate 50 and the interconnector plate 60. The flow adjustment element 80 serves as a fluid-flow impedance between the plates 50, 60, which restricts the flow of the reactants in the reactant flow passageways. Thus, the flow adjustment element 80 provides for greater uniformity of flow. A preferred flow adjustment element is a wire mesh or screen, but any suitable design can be used provided it serves to restrict the flow of the reactants at a selected and determinable rate. Alternatively, a spacer plate can be interposed between the plates 50 and 60, or used in combination with the reactant flow element 80.

Referring to FIG. 5, the electrolyte plates 50 and the interconnector plates 60 are alternately stacked and aligned along their respective apertures. The apertures form axial (with respect to the stack) manifolds that feed the cell unit with the input reactants, and that exhaust spent fuel. In particular, the central apertures 52, 62 form input oxidizer manifold 47, the concentric apertures 54, 64 form input fuel manifold 48, and the aligned outer apertures 56, 66 form spent fuel manifold 49.

The absence of a ridge or other raised structure at portion of the periphery of the interconnector plate provides for exhaust ports that communicate with the external environment. The reactant flow passageways connect, fluidwise, the input reactant manifolds 47 and 48 with the outer periphery of the reformer 110 thus allowing the reactants to be exhausted externally of the converter.

The internal reforming electrochemical converter is a stacked plate assembly of cylindrical configuration, and at least one of the electrolyte plate and the conductive plate has a diameter between about 1 inches and about 20 inches, and has a thickness between about 0.002 inches and about 0.2 inches.

In FIG. 6, the internal reforming electrochemical converter 240 of this invention has incorporated therein additional features as described below. The internal reforming operation when performed in the presence of steam receives a reactant gas mixture containing natural gas (or methane), or vaporized kerosene, methanol, propane, gasoline, or diesel fuel, and steam. A steam reforming catalyst 290 is distributed in a circumferential band that precedes a fuel electrode material 250B disposed on the electrolyte plate 250. Thermal energy for the reforming reaction is conducted radially by the plate 260 to the reforming band. The thickness and thermal conductivity of the plates is designed to provide sufficient heat flow radially between the inner reforming band 290 and the outer fuel cell band (e.g., band 250B) to provide heat energy for the endothermic reforming reaction and to pre-heat the incoming reactants.

The internal reforming of FIG. 6 can also be performed by a partial oxidation reaction or autothermal reaction. In this mode, the illustrated converter 240 receives a reactant gas mixture containing hydrocarbon fuels such as natural gas (or methane), and air, oxygen or/and steam. One or more types of catalyst are distributed in circumferential bands preceding the fuel electrode 250B on the electrolyte plate 250. As shown in FIG. 6, the electrolyte plate includes an inner band that contains a combustion catalyst 292, a radially outer band 290 that contains catalysts to promote reforming of methane by water vapor (steam reforming) and by carbon dioxide. Thermal energy for these endothermic reforming reactions is conducted radially from the combustion band 292 to the reforming band 290. Catalysts for other reactions, e.g. shift reactions etc. may also be incorporated. The thickness and thermal conductivity of the conductive plates is designed to provide sufficient heat flow radially between the inner combustion band 292 and the radially outer reforming band 290 to provide the endothermic reaction energy and to pre-heat the incoming reactants. Additional thermal energy can be obtained from the exothermal fuel cell reaction performed by the fuel electrode 250B illustrated as an outermost band along the diameter of the plate.

In the illustrated electrochemical converter 240, the combustion catalyst 292, the reforming catalyst 290 and a shift catalyst (which can be also applied as a band radially outward of the reforming catalyst 290) can also be applied on the flow adjustment element, which is situated between the electrolyte plate and the conductive plate. The reformer may apply the catalysts which are mixed in varying proportions radially to maximize the production of product gas.

All of the reforming features discussed above in relation to the external reformer and band are equally applicable to this internal reforming electrochemical converter. For example, the interconnector plate 260 can include extended lip portions 272A and 272B, either of which can be used to preheat incoming reactants.

The internal reforming electrochemical converter 240 of the present invention can be a fuel cell, such as a solid oxide fuel cell, molten carbonate fuel cell, alkaline fuel cell, phosphoric acid fuel cell, and proton membrane fuel cell. The preferred fuel cell of the present invention is a solid oxide fuel cell. The internal reforming electrochemical converter 240 of the present invention preferable has an operating temperature above 600° C., and preferably between about 900° C. and 1100° C., and most preferably about 1000° C.

Those of ordinary skill will appreciate that the illustrated combustion, reforming and fuel electrode bands are merely representative of relative locations of electrochemical operations that occur during use of the converter 240 as a reformer.

In another embodiment of the invention, the internal reforming electrochemical converter 240 can have any desirable geometric configuration, such as a rectilinear configuration. The stacked structure can thus include rectangular electrolyte plates 250 and rectangular interconnector plates 260 with manifolds attached external to the plates. The catalytic and electrode materials can be applied in strips on the electrolyte plates perpendicular to the reactants flow direction. As illustrated in FIG. 6, the fuel flow 224 is perpendicular to the elongated bands 292, 290 and 250B. The interconnector plates 260 conductively transfer heat energy to the endothermic reforming catalyst band 290, the exothermic combustion catalyst band 292, and the exothermic fuel cell band 250B, resulting in a substantially in-plane isothermal condition, as illustrated in FIG. 7.

Figure 7:
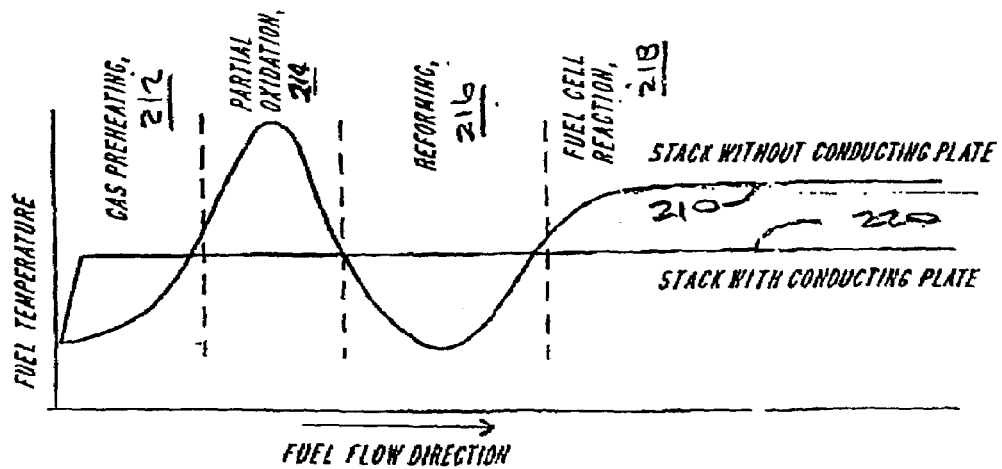
FIG. 7 graphically illustrates that the interconnector plates of the reformer of FIG. 2 that provide the heat transfer function among the endothermic reforming band, exothermic combustion band, and exothermic fuel cell band, resulting in an isothermal in-plane temperature

FIG. 7 graphically depicts the isothermal temperature condition of the incoming reactants, e.g., hydrocarbon fuel, and reformed fuel established by the thermally conductive plate 260 during its passages over the electrolyte plate 250 of FIG. 6. The temperature of the fuel during operation is defined by the ordinate axis and the fuel flow direction is defined by the abscissa. In a reforming structure that does not utilize a thermally conductive plate to transfer heat in-plane during operation, the fuel temperature varies greatly in the direction of fuel flow, as denoted by waveform 210. As illustrated, the incoming fuel is initially preheated, as by the extended surfaces 272A and 272B of FIG. 6. This preheating stage 212 corresponds to a rise in the fuel temperature as it approaches the operating temperature of the converter 240. During the exothermic partial oxidation or combustion stage 214, the temperature of the fuel further increases until the fuel flow reaches the reformation stage 216. The endothermic reformation stage requires a significant amount of heat energy to sustain the reforming operation. The fuel then flows to the fuel cell reaction stage 218, where the fuel is again heated, e.g., by the relatively hot operating environment of the converter 240. This sinusoidal like temperature profile 210 of the fuel decreases the overall operating efficiency of the converter, as well as exposes certain components (the electrolyte plate 250) to undesirable thermal stresses. The introduction of the conductive (interconnector) plate within the converter 240 "smoothes" the temperature profile and creates a substantially isothermal temperature condition, in-plane and axially along the converter stack, through all stages of operation as illustrated by the isothermal profile 220.

According to one mode of operation, the internal reforming electrochemical converter catalytically reforms the hydrocarbon fuel with $H_2O$ to produce $H_2$ and CO, which in turn proceeds to the fuel cell portion (e.g., fuel electrode 250B) for electricity generation. It produces exhaust species $H_2O$ and $CO_2$. The heat from the exothermic fuel cell reaction is conductively transferred in-plane to the conducting plates to support the endothermic reforming reaction.

According to another mode of operation, the internal reforming electrochemical converter catalytically oxidizes hydrocarbon fuel to produce $H_2$ and CO, which proceeds to the fuel cell section for electricity generation. It produces exhaust species $H_2O$ and $CO_2$. The heat from the exothermic fuel cell reaction is conductively transferred in-plane to the conductive plates 260 to support the mildly exothermic partial oxidation reforming or autothermal reforming reaction. The internal reforming electrochemical converter can be placed in an enclosure designed for pressurized operation, such as the collection vessel 120.

The illustrated electrochemical converter 40 of FIG. 4 (or 240 of FIG. 6) is also capable of performing chemical transformation and production, while concomitantly producing electricity in a coproduction operation.

According to this embodiment, the electrochemical converter 40 or 240 is adapted to receive electricity from a power source, which initiates an electrochemical reaction within the converter and reduces selected pollutants contained within the incoming reactant into benign species. Hence, for example, the electrochemical converter 40 or 240 can be coupled to an exhaust source that contains selected pollutants, including NOx and hydrocarbon species. The converter 40 or 240 catalytically reduces the pollutants into benign species, including $N_2$, $O_2$ and $CO_2$.

Figure 10:
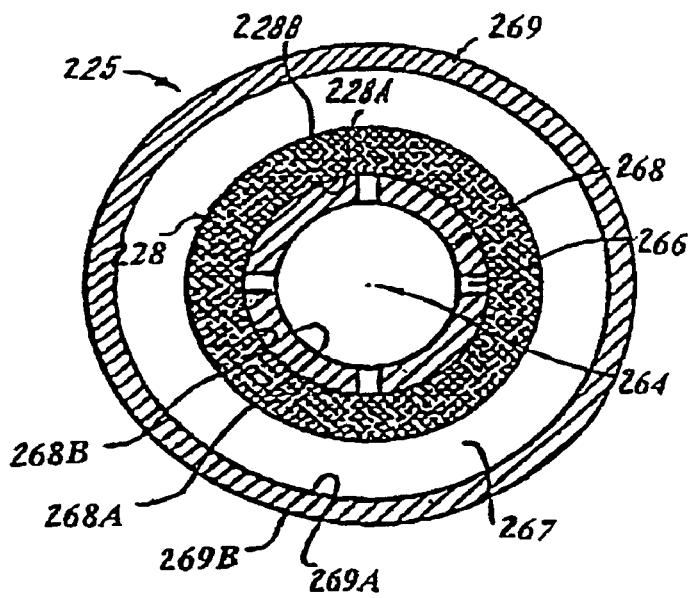
FIG. 10 is a cross-sectional end view of still another embodiment of the thermal control stack of FIG. 1.
Figure 11:
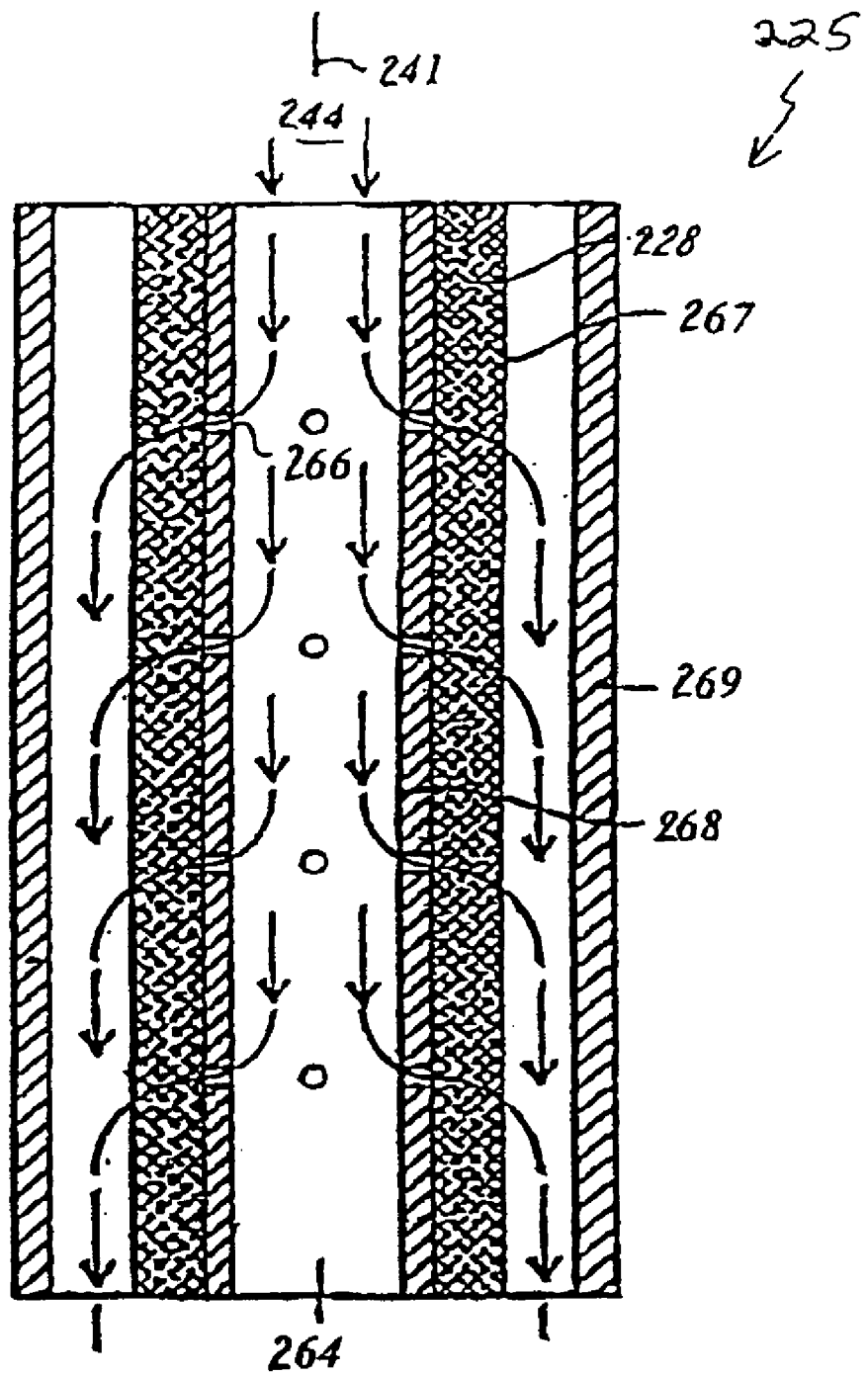
FIG. 11 is a cross-sectional view of the thermal control stack of FIG. 10.
Figure 12A:
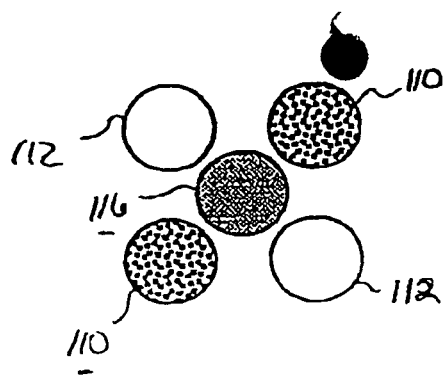
FIGS. 12A-12E are schematic representations of the various arrangements of the components of the energy system of the present invention.
Figure 12B:
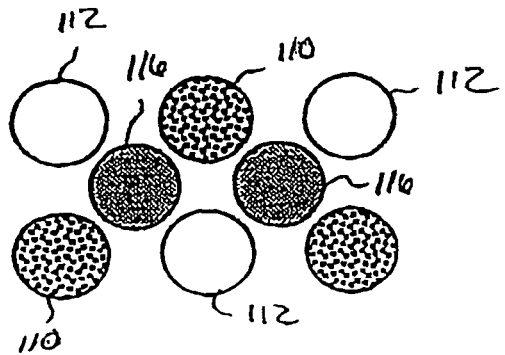
Figure 12C:
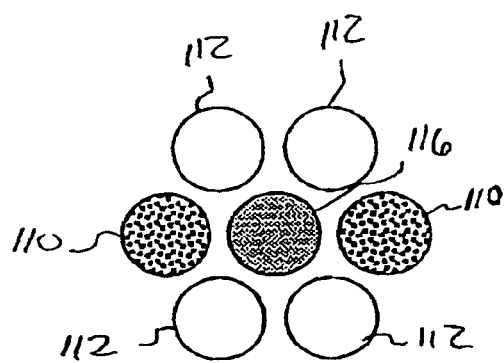
Figure 12D:
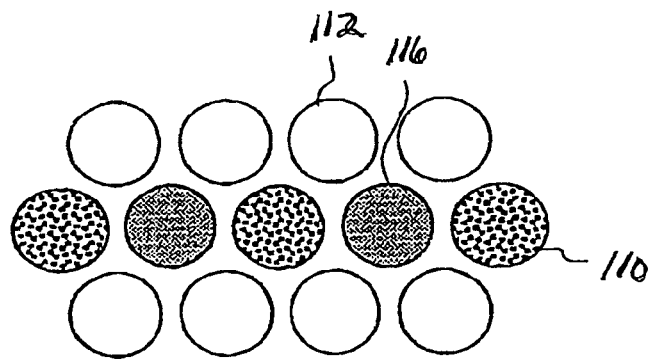
Figure 12E:
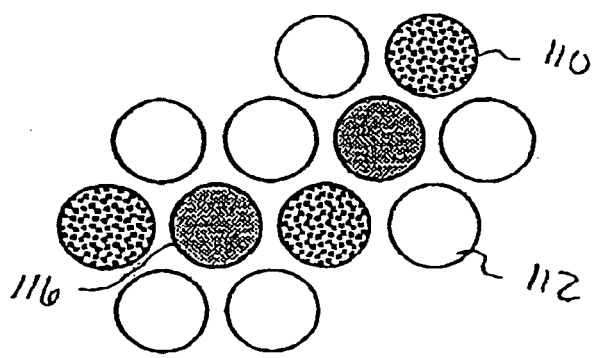

With reference to FIGS. 1 and 8-11, the thermal control stack 116 of FIG. 1 can be operated to heat and/or cool the fuel cell 112 during use. The term thermal control stack as used herein is intended to include any suitable structure capable of functioning either or both as a heat source or a heat sink for the chemical converter system 72. The thermal control stack 116 can also preferably function as an isothermal surface to decrease or eliminate temperature non-uniformities along the axial length of the fuel cell 112. This preserves or enhances the structural integrity of the chemical converter system 72 of the present invention. During use, the thermal control stack is disposed within the pressure vessel 120 and is in thermal communication with the fuel cell. The thermal control stack 116 can be mounted relative to the fuel cell 112 and the reformer 110 in any selected arrangement to achieve the appropriate system thermal management. One particular arrangement suitable for this purpose is to interdigitate the reformer, fuel cell, and thermal control stack to form a single collection of units that achieves the desired thermal management. This arrangement can form a rectangular or hexagonal pattern, or any other suitable two-dimensional or three-dimensional arrangement. For example, as illustrated in FIGS. 12A-12E, the components of the chemical converter system 72, such as the reformer 110, the fuel cell 112, and the thermal control stack 116, can have a quadrilateral arrangement, such as a square or rectangular interdigitated arrangement as shown in FIGS. 12A and 12B. Alternatively, the components of the chemical converter system 72 can be arranged in a hexagonal shape, as shown in FIGS. 12C-12E.

With reference again to FIG. 1, the fuel cell 112 generates exhaust 115 that is captured or collected by the collection vessel 120. Further disposed within the collection vessel 120 is a thermal control stack 116 that is thermally coupled to the fuel cell 112. The illustrated thermal control stack 116 can include any selected structure for interfacing with the fuel cell 112 in order to control, adjust or regulate the temperature of a component of the electrochemical converter system 72, such as the fuel cell, either alone or in combination with other temperature regulating structure. Those of ordinary skill will readily recognize that the thermal control stack 116 can operate both as a heating device upon system start-up, and as a cooling device or heat sink during established system use. The fuel cell 112 and/or the collection vessel 120 can employ power leads that couple the direct current electricity generated by the electrochemical converter system 72 with the inverter 114. The inverter 114 may convert the direct current electricity generated by the electrochemical converter system 72 into alternating current for subsequent transfer to a power grid, power storage device, or power consuming apparatus.

The thermal control stack 116 is in thermal communication with the fuel cell 112 and is also arranged to receive both fuel 99b and air. The thermal control stack can function as a heating element or source by combusting fuel in the presence of air to generate heat for preheating the fuel cell 112. This operation continues to maintain an appropriate operating temperature, typically 1,000° C., whereby the fuel cell 112 continues to consume fuel and air in order to electrochemically react these reactants to produce electricity. Once the fuel cell reaches its desired operating temperature, the fuel supplied to the thermal control stack can be decreased or stopped, and air can continue to pass therethrough in order to assist in removing heat from the fuel cell 112. In this arrangement, the thermal control stack functions as a cooling element or heat sink for removing waste heat from the fuel cell during operation.

Figure 8:
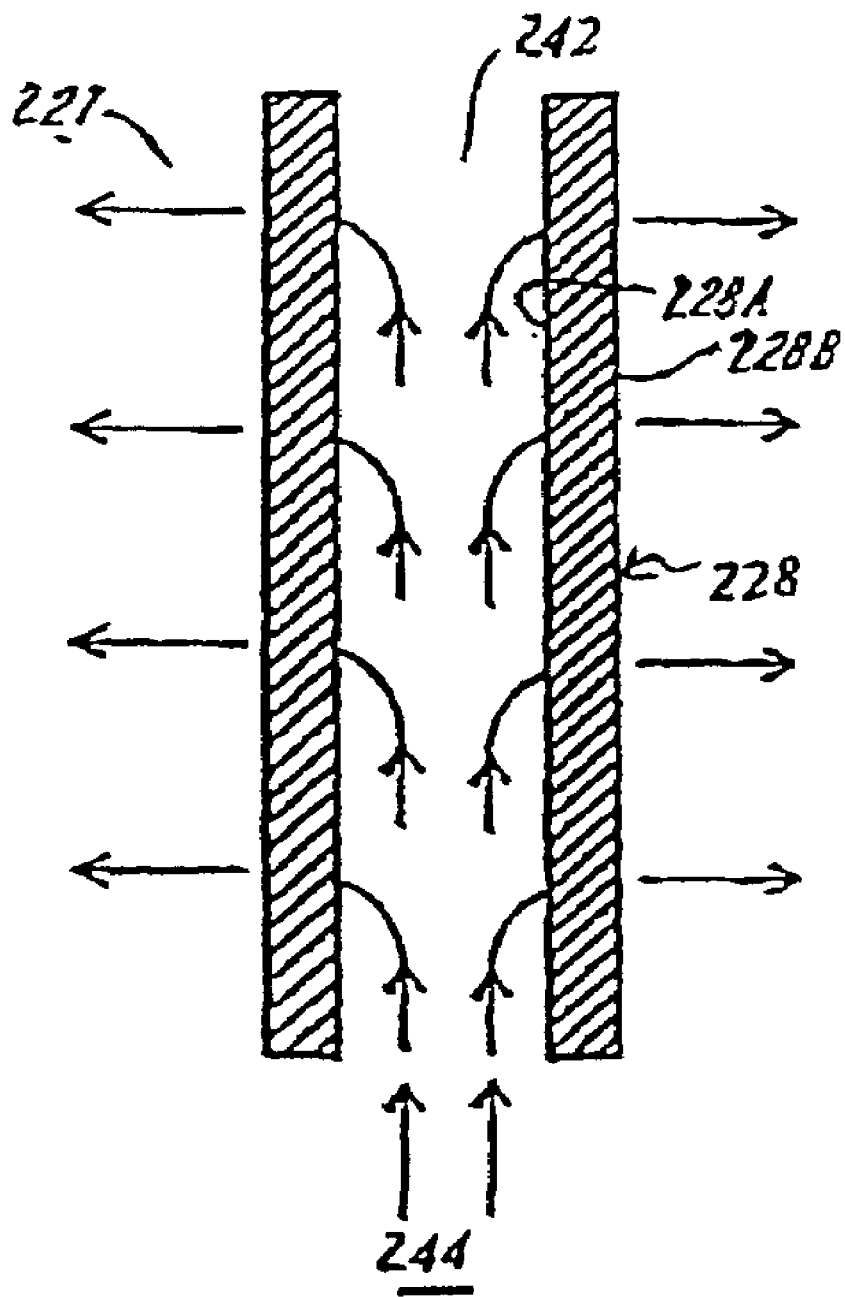
FIG. 8 is a cross-sectional view of an alternate embodiment of the thermal control stack of FIG. 1.

According to one embodiment, as shown in FIG. 8, the thermal control stack 116 can be formed as an isothermal structure (heat exchanger) 227 having a porous structure 228, which receives radiated heat from its environment (e.g., from a nearby fuel cell). A working fluid 244, such as the oxidizer reactant, flows in an inner passageway or reservoir 242 and permeates radially outward from an inner surface 228A to the outer face 228B. The working fluid 244 can be collected by any suitable structure, such as by the collection vessel 120 of FIG. 1, and can be conveyed to other parts of the energy system 70 of FIG. 1. To ensure the axial and azimuthal uniformity of the working fluid 244 flow rate, the radial pressure drop as the working fluid permeates through the structure 228 is maintained to be substantially greater than the pressure of the working fluid 244 as it flows through the reservoir 242. An inner flow distribution tube may be mounted within the structure 228 to enhance the flow uniformity. The working fluid 244 can also be discharged from either axial end.

Figure 9:
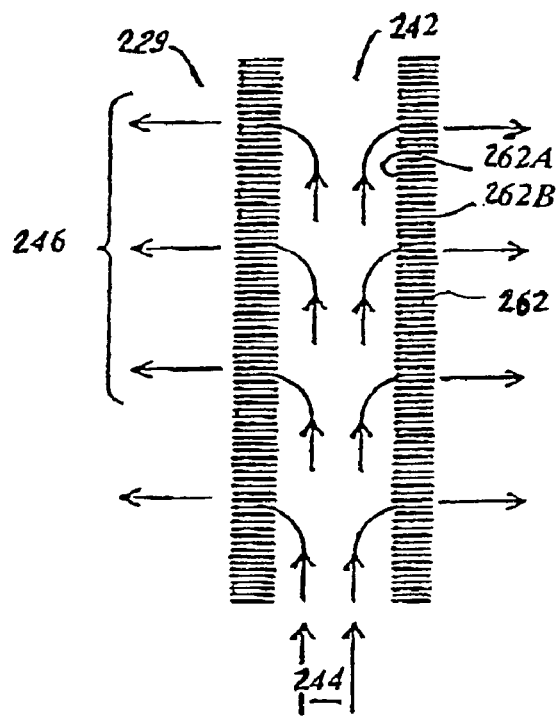
FIG. 9 is a cross-sectional view of an alternate embodiment of the thermal control stack employing a plurality of plates.

According to another embodiment, the thermal control stack 116 according to the present invention can also employ a plurality of thermally conductive plates, as depicted in FIG. 9. The thermal control stack 116 can be formed as a stack 229 having a series of plates 246 that are stacked on top of each other, as shown. The plates 246 can be formed of any suitable thermally conductive material, such as nickel and other materials typically used with fuel cells. A central fluid passageway or reservoir 242 connects the plates, while spaces are provided between the plates to allow a working fluid 244 to flow from an inner surface 262A to an outer surface 262B. The working fluid 244 flows through the reservoir 242 connecting the plates 262. The plates 262 can have a substantially cylindrical configuration as shown, or can have any other suitable geometric shape, such as a tubular shape. The embodiment of FIG. 9 is particularly useful in the construction of isothermal fuel cells. For example, by using spacing elements between cell units, a uniform flow of reactants can be achieved.

FIG. 10 shows a cross-sectional end view of another embodiment of the thermal control stack 116 suitable for use in the energy system of FIG. 1. The illustrated stack 225 includes three concentric tubular structures that are preferably axially spaced as shown. The inner lumen 264 has a plurality of passageways 266 that extend between an inner face 268A and an outer face 268B of a sleeve or tube 268. A porous sleeve structure 228 surrounds inner tube 268 and has an inner surface 228A and an outer surface 228B. The inner surface 228A is in intimate facing contact with the outer surface of the inner tube 268, such that the transverse passageways 266 are in fluid communication with the porous sleeve 228. The transverse passageways 266 are evenly spaced apart, although any spacing can be used.

An outer tube 269 or wall element is disposed about the porous sleeve 228 and the inner tube 268, thereby forming a substantially co-axial geometry. The outer tube 269 has an internal surface 269A and an external surface 269B. The interior lumen 264 of inner tube 268 forms an elongate central passageway that serves as a reservoir for the working fluid 244 as shown in FIG. 11. The interior space between the internal surface of the outer tube 269A and the porous sleeve outer face 228B forms an elongate second passageway 267 that is substantially parallel to the central passageway 264.

The inner tube 268 and the outer tube 269 are preferably made of the same material, such as metal or ceramics. The porous sleeve structure 228 can be ceramic and serves to diffuse the flow of the working fluid from the inner lumen to the outer lumen.

Referring to FIG. 11, the working fluid 244 flows through the elongate central lumen or passageway 264 that serves as a reservoir and which extends along a longitudinal axis 241. As the working fluid 244 flows through the reservoir 264, the working fluid is forced through the transverse passageways 266. The sleeve 228 overlies the transverse passageways 266 so as to receive that portion of the working fluid 244 that flows through the passageways 266. The working fluid 244 permeates radially outward through the porous sleeve 228 into the outer lumen 267 where the fluid is heated by an external heat source, e.g., a fuel cell assembly or other system which requires cooling, or is cooled by other structure. The working fluid 244 contained within the outer lumen 267 flows along the internal surface of the outer tube 269, and absorbs heat conductively transferred thereto from the external surface 269B. The outer tube's external surface 269B can be heated by being placed in direct contact with the fuel cell assembly 112, or by being radiantly coupled to the fuel cell 112. The distribution of the working fluid 244 along the internal surface 269A of the outer tube 269 provides for the effective transfer of heat between the working fluid 244 and the external environment. By selectively spacing the transverse passageways 266 along the inner tube 268, the working fluid 244 collected within the second passageway 267 maintains a constant temperature. The uniform distribution of the isothermic working fluid 244 along the inner surface 269A creates an isothermal condition along the external surface of the outer tube 269B. The passageway size and spacing are dependent upon the outer tube 269 and the inner tube 268 diameters.

The foregoing description describes the thermal control stack 116 as operating as a heat sink. Those of ordinary skill will realize that the thermal control stack 116 can also operate as a heat source. For example, the working fluid 244 can comprise a heated fluid rather than a coolant. As the heated fluid flows through the reservoir 264, heat is transferred from the external surface of the outer tube 269B to an external environment.

It should also be appreciated that the principles of the present invention can also be applied to construct isothermal fuel cells (and other electrochemical converters) by employing similar structures which distribute the reactants uniformly along the length of a fuel cell stack. The temperature of the stacks as a whole can be regulated and, when desired, rendered isothermal.

Other embodiments of the thermal control stack would be obvious to the skilled artisan in light of the teachings herein, and include employing a hollow porous cylinder that has various shaped surface structures disposed therein. The surface structures can be composed of metal or ceramic, and the porous cylinder can be composed of any suitable material, including a wire mesh screen.

Referring again to FIG. 1, the components of the chemical converter system 72 are mounted within the illustrated collection vessel 120. The collection vessel 120 can be any suitable vessel that is sized and dimensioned for housing any number of chemical converters, such as the reformer 110 and/or the fuel cell 112, and the thermal control stack 116, while concomitantly functioning as a fluid collection vessel for collecting the exhaust of the fuel cell 112 and/or the thermal control stack 116. The collection vessel can be a "positive pressure vessel," which is intended to include a vessel designed to operate at pressures up to 10 atmospheres, or a vessel designed to tolerate much higher pressures, up to 1000 psi. A lower pressure vessel is useful when the bottoming device used in conjunction with the chemical converter is, for example, an HVAC system that incorporates a heat-actuated chiller or a boiler. A higher pressure vessel is useful, for example, with the illustrated energy system 70. The illustrated collecting vessel collects exhaust at temperatures and pressures suitable for the a bottoming device, such as a gas turbine assembly, a steam turbine/generator, a thermal fluid boiler, a steam boiler, a heat actuated chiller, an HVAC system, and the like.

Figure 13:
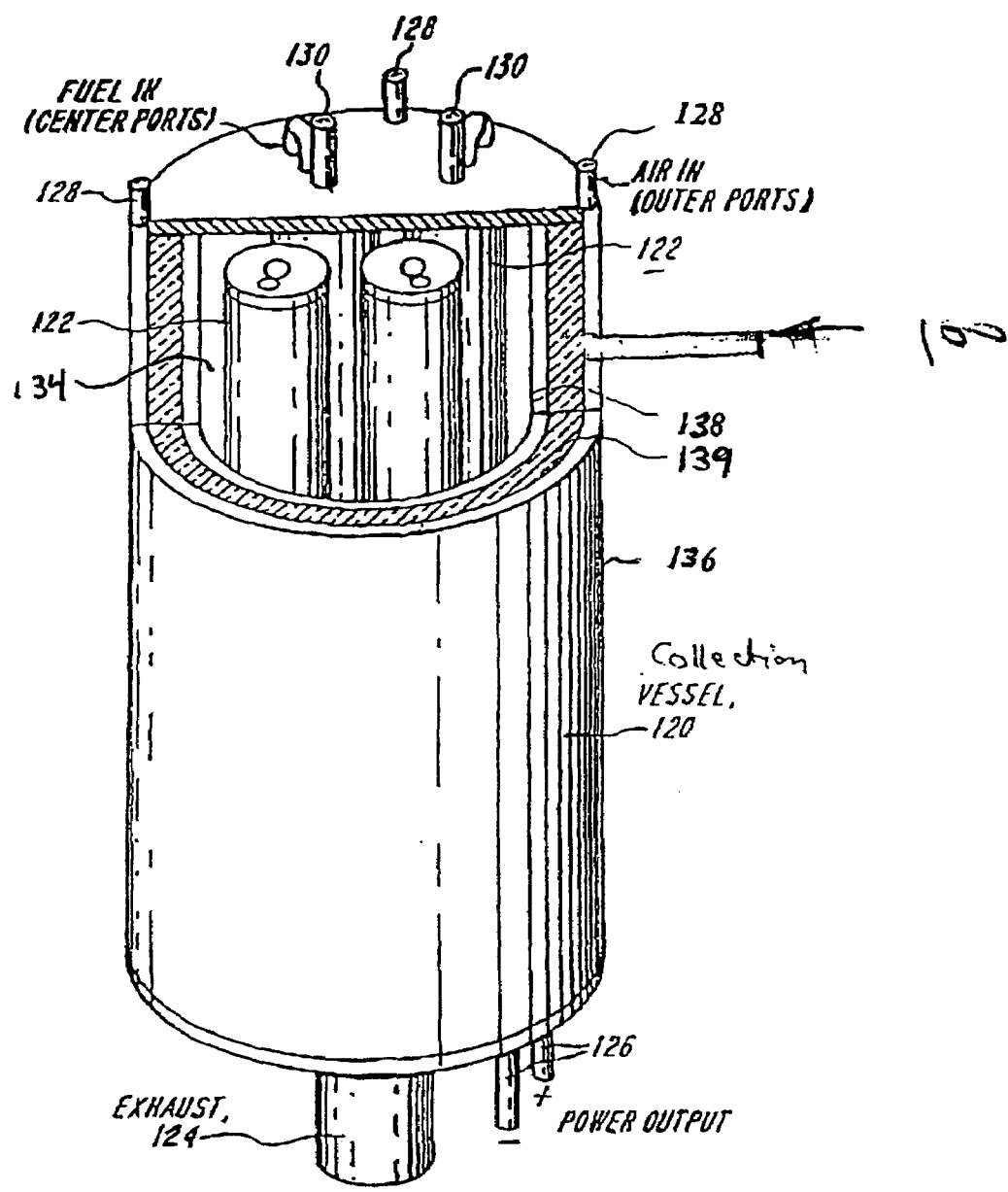
FIG. 13 is a plan view, partially cut-away, of a collection vessel of the energy system of FIG. 1 according to the teachings of the present invention.

A preferred type of collection vessel is illustrated in FIG. 13, where a collection vessel 120, which may also function as a regenerative or recuperative thermal enclosure, encases a series of stacked chemical converters 122. The collection vessel 120 includes an exhaust outlet manifold 124, electrical connectors 126 and input reactant manifolds 128 and 130. According to one practice, the oxidizer reactant is introduced to the resident chemical converters 122 through the manifolds 128, and the fuel reactant is introduced through the fuel manifolds 130.

The chemical converters 122 vent exhaust gases to the interior of the collection vessel 120. The pressure of the exhaust gases appropriate to the bottoming device used in conjunction with the collection vessel can be controlled through use of a pump, compressor, or through use of a blower as shown and described in U.S. Pat. No. 5,948,221 of Hsu, the contents of which are herein incorporated by reference, for selectively pumping an input reactant into, and hence exhaust gases out of, the chemical converters 122.

As described above, the chemical converter can be operated at an elevated temperature and at either ambient pressure or at an elevated pressure. The chemical converter is preferably a fuel cell system that can include an interdigitated heat exchanger, similar to the type shown and described in U.S. Pat. No. 4,853,100, which is herein incorporated by reference.

The collection vessel 120 can include an outer wall 136 spaced from an inner wall 138, thereby creating an annulus therebetween. The annulus can be filled with an insulative material 139 for maintaining the outer surface of the vessel at an appropriate temperature. Alternatively, the annulus can house or form a heat exchanging element for exchanging heat with the collection vessel. In one embodiment of a heat exchanger, the annulus and walls 138 and 136 can form a heat exchanging jacket 190 for circulating a heat exchanging fluid therein. The heat exchanger formed by the walls exchanges heat with the pressure vessel and helps maintain the outer surface at an appropriate temperature. Of course, the use of the annulus as a cooling jacket does not preclude the additional use of an insulative material, located other than in the annulus, for reducing heat loss from the interior of the pressure vessel or for also helping to maintain the outer surface of the pressure vessel at an appropriate temperature.

In one embodiment of the invention, the heat exchanging fluid circulated in the pressure vessel heat exchanger, such as the cooling jacket formed by walls 136 and 138 is an input reactant, such as the air input reactant flowing in the manifolds 128. Additional manifolding (not shown) fluidly connects the annulus to the chemical converters 122 such that the air input reactant is properly introduced thereto. The preheating of the air input reactant by the cooling jacket formed by walls 136 and 138 serves several purposes, including preheating the air input reactant to boost efficiency by regeneratively capturing waste heat, and cooling the outer surface of the pressure vessel 120.

In an alternate embodiment, the insulation 139 can form the inner wall (rather than wall 138) and is constantly exposed to the exhaust generated by the chemical converters. In this arrangement, it is important to ensure that any non-combusted (e.g., combustible) fuel gases exhausted by the chemical converters 122 do not accumulate within the vessel chamber 134 to potentially dangerous levels. In order to ensure operational safety, a purge gas 100 can be introduced to the vessel chamber 134 before, during or after operation of the chemical converter system 72. The purge gas 100 preferably displaces the unwanted gases within the vessel chamber 134 and within the voids formed between the wall 136 and the insulation 139 of the collection vessel 120 with a relatively stable gas, such as air, nitrogen and the like.

With reference again to FIG. 1, the energy system 70 further employs one or more sensors coupled to the collection vessel 120 for sensing or detecting one or more parameters of one or more components of the system 70. For example, the sensors can be employed to ensure proper operational safety of the system 70. The illustrated system includes one or more optional thermal sensors 170 and chemical sensors 172 that are coupled to the collection vessel 120 and to the controller 174. The illustrated thermal sensor 170 can be arranged to sense or detect one or more parameters of a chemical converter, such as the thermal control stack 116, mounted within the collection vessel 120. The sensor 170 can be an infrared (IR) sensor, ultraviolet (UV) sensor, or a thermocouple or thermostat that senses or detects the thermal condition of the stack to determine if proper combustion or heating is occurring in the thermal control stack 116. The sensor can operate by detecting radiation from the thermal control stack or from a flame around the stack. The radiation is emitted from the stack and the information is correlated by the controller 174. The sensor can determine if proper combustion is occurring by sensing the presence or absence of a flame (or thermal radiation). According to one practice, the system 70 can cease introduction of fuel to the thermal control stack in the absence of a flame or proper combustion in order to avoid unsafe levels of combustible fuel from accumulating within the collection vessel 120. This can be achieved by employing one or more fluid regulating devices positioned at appropriate locations in the system. Hence, unsafe operation of the system 70 can be avoided or averted.

The energy system 70 can also employ a chemical sensor 172 to sense or detect exhaust collected within the collection vessel 120. The sensor 172 can be a gas sensor that is adapted to sense or detect the presence or absence of one or more constituent components of the exhaust, such as oxygen. The sensor can be coupled to the controller 174, which controls via any suitable device the delivery of one or more reactants (e.g., fuel and/or air) to one or more components of the chemical converter system 72. According to one practice, the sensor 172 is an oxygen sensor that senses the presence or absence of oxygen in the exhaust to ensure sufficient oxygen is available within the system 72, and to ensure that no unburned fuel is accidentally released from the vessel. The sensor can be coupled to the collection vessel 120 or disposed relative to the exhaust stream 180 to sense the presence or absence of excess oxygen.

Moreover, sensing the fluid constituent with the sensor 172 and then regulating the delivery of fluid to the chemical converter system 72 provides for optimum operational conditions within the system 70 by efficiently and easily preventing, avoiding or eliminating the creation and/or accumulation of pollutants, such as hydrocarbons, carbon monoxide, and oxides of nitrogen, within the collection vessel. In order for the system to be operated properly, the oxygen concentration in the exhaust should be above the stoichiometric condition. In order to achieve optimal operation, the oxygen level or concentration is regulated relative to the stoichiometric condition. A typical and safe efficient condition is to maintain the oxygen level in the exhaust to between about 2% and about 4%, which corresponds to passing about 10% to about 20% excess air reactant through the system 72. The oxygen sensor can be any suitable sensor, such as an electrochemical sensor, that determines the partial pressure of oxygen by comparing oxygen concentration in the exhaust with the oxygen concentration in the ambient environment. This sensor type is commercially available from Bosch. Oxygen sensors are well known and characterized and need not be discussed further herein.

The illustrated energy system 70 can further include one or more temperature sensors 178 coupled to the collection vessel 120 to sense a selected temperature therein. The sensor 178 can be positioned so as to sense the interior temperature of the collection vessel 120, the exhaust 180 within or without the collection vessel 120 or one or more components of the chemical converter system 72, such as the thermal control stack 116, the fuel cell 112, and/or the reformer 110. The sensor 178 can be any suitable sensor adapted to sense temperature, such as a thermocouple. The sensor 178 can be coupled to the controller 174 in order to provide a feedback loop to enable the system 70 to control the flow of one or more system fluids, or control the operation of selected system components, in order to regulate, monitor, detect, maintain or vary a temperature within the system. By doing such, the illustrated system 70 can ensure that the system functions within certain temperature ranges in order to ensure safe and efficient system operation.

The controller 174 can be of any conventional design, such as an industrial ladder logic controller, a microprocessor, a stand-alone computing apparatus, a computing apparatus that is coupled in a network configuration, or any other suitable processing device which includes suitable hardware, software and/or storage for effectuating control of the energy system. The phrase "computing apparatus" as used herein can refer to a programmable or non-programmable device that responds to a specific set of instructions in a well-defined manner and/or can execute a predetermined list of instructions. The computing apparatus can include one or more of a storage device, which enables the computing apparatus to store, at least temporarily, data, information, and programs (e.g., RAM or ROM); a mass storage device for substantially permanently storing data, information, and programs (e.g., disk drive or tape drive); an input device through which data and instructions enter the computing apparatus (e.g., keyboard, mouse, or stylus); an output device to display or produce results of computing actions (e.g., display screen, printer, or infrared, serial, or digital port); and a central processing unit including a processor for executing the specific set of instructions.

With reference again to FIG. 1, the exhaust 180 collected within the collection vessel 120 is discharged through any suitable fluid connections and is eventually introduced to the gas turbine assembly 74. In addition to the power generated by the fuel cell 112, the gas turbine assembly 74 also produces power by serving as a bottoming device to convert the exhaust and waste heat generated by the chemical converter system 72 into usable electrical power, thus increasing the overall efficiency of the energy system 70.

Typically, the exhaust emitted from the chemical converter system 72 is in the range of about 1,000° C. The exhaust having this temperature may need to be heated or cooled prior to introduction to the gas turbine assembly 74. In these applications, a secondary heating or cooling structure, such as an additional combustor or structure for adding or mixing in a cooling fluid, can be interposed between the collection vessel 120 and the gas turbine assembly 74 in order to provide temperature regulation to the exhaust, such that the exhaust is more compatible with the operational conditions of the gas turbine assembly. In other applications, the exhaust exiting the chemical converter system is already closely matched with the gas turbine assembly 74, and hence the exhaust does not require additional heating or cooling. In certain applications, the exhaust temperature of the chemical converter system 72 may be higher than a desired level. For example, particularly in gas turbine assemblies employing smaller turbine units, the temperature of the input drive gas is generally within a range of between about 800 to 900° C. Hence, the 1,000° C. exhaust temperature exiting the chemical converter system 72 and collected within the vessel 120 is incompatible with the input temperature range of the gas turbine assembly. It is hence desirable to adjust, control or regulate the temperature of the exhaust of the chemical converter system 72 to match the operational requirements of the gas turbine assembly 74 during operation.

The exhaust 180 generated by the chemical converter system 72 and discharged from the collection vessel 120 forms the drive gas for the gas turbine assembly and is eventually introduced to the turbine expander 78. The turbine expander adiabatically expands the exhaust and converts the thermal energy of the exhaust into rotary energy. Since the turbine expander 78, generator 84, and compressor 76 can be disposed on a common shaft, the generator 84 produces AC or DC electricity, and the compressor compresses the input air reactant as described above. Those of ordinary skill will readily recognize that the frequency of the electricity produced by the generator is at least 1000 Hz, and typically is from about 1200 to about 1600 Hz. The alternating current electricity produced by the generator 84 can be rectified by any suitable means, such as a rectifier, to convert the alternating current electricity to direct current electricity. This direct current electricity may be combined with the direct current electricity produced by the chemical converter system 72, prior to transformation by the inverter 114. Additionally in this arrangement, the chemical converter system 72 functions as an external combustor of the gas turbine assembly, which in turn functions as a bottoming device for the system 70.

The turbine expander 78 then generates an exhaust, referred to as the turbine exhaust 184, which is introduced to the heat exchanger 188. A portion of the heated air 86 from the compressor 76 can optionally be introduced to the heat exchanger 188 where it can be further heated in a recuperative or a counterflow scheme by the turbine exhaust 184 passing through the exchanger.

The turbine exhaust 184 exiting the heat exchanger 188 can optionally pass through the HRSG 94 where it also facilitates the conversion of the reforming agent (water) 88 into steam for subsequent introduction to the reformer 110. The turbine exhaust can then exhausted or vented to other devices or to the ambient environment.

As set forth above, the inputs to the energy system 70 are an oxygen containing gas, typically air; a fuel, which is typically natural gas, and which is principally composed of methane; and a reforming agent 88. The air and fuel hence function as reactants for the chemical converter system 72.

The input oxidizer reactant is used for oxidizing the fuel in the fuel cell 112, which are compressed and heated by the compressors 76. The compressed, heated and pressurized air 86 is then heated in the heat exchanger 188 by the turbine exhaust exiting the turbine expander 78. Although the oxygen containing gas is typically air, it can be other oxygen-containing fluids, such as air partially depleted of oxygen, or air enriched with oxygen. The air and fuel reactants are consumed by the electrochemical converter 112 or thermal control stack 116, which in turn generates electricity and exhaust which is captured by the collection vessel 120.

An advantage of the energy system of FIG. 1 is that it allows electricity to be produced in an high efficiency system by the direct integration of a highly efficient, compact electrochemical converter with a gas turbine assembly operating as a bottoming device or plant. The integration of the chemical converter system 72 with a gas turbine assembly 74 produces a hybrid system that has an overall power efficiency of about or greater than 70%. This system efficiency represents a significant increase over the efficiencies achieved by prior art gas turbine systems and prior art electrochemical systems alone. The illustrated hybrid system incorporates an electrochemical converter such as a fuel cell 112 to provide electricity and high grade thermal energy. For example, the fuel cell operates as a low NOx source, thereby improving environmental performance relative to conventional gas turbine generating plants.

A further advantage of the invention is that the system mounts a chemical converter, such as the fuel cell and/or reformer, in a collection vessel with a thermal control stack. This configuration provides for a compact and easily arranged and integratable assembly that can be used for a variety of purposes.

Another advantage of employing multiple sensors with the system 70 is that they ensure safe operation of the system without accumulating unwanted and potentially dangerous levels of combustibles within the exhaust collected by the vessel 120.

Other variations of the above designs exist and are deemed to be within the purview of one of ordinary skill. For example, a series of gas turbine assemblies may be employed, or any number of compressors, combustors and turbines may be used. The present invention is further intended to encompass the integration of an electrochemical converter with most types of gas turbines, including, single-shaft gas turbines, double-shaft gas turbines, recuperative gas turbines, intercooled gas turbines, and reheat gas turbines. The present invention hence encompasses a chemical energy system that combines a chemical converter and a conventional gas turbine. According to one preferred practice of the invention, the converter can replace, either fully or partially, one or more combustors of the gas turbine power system.

With reference again to FIG. 1, upon start-up operation of the chemical converter system 72, the system 70 passes the purge gas 100 through the collection vessel 120 to purge the vessel chamber 134 and the isolated void or volume in order to confine fuel entering the vessel to the components of the chemical converter system 72 and to chamber 134. This purge prevents or inhibits the accumulation of hazardous or potentially dangerous gases, such as unburned fuel, from accumulating in the vessel chamber 134 or the isolated space during the startup period.

Further upon start-up operation, the thermal control stack 116 functions as a start-up heater for the chemical converter system 72. In order to initiate start-up operation of the energy system 70, the compressor 76 of the gas turbine assembly 74 is actuated by a separate motor (not shown) or the generator which functions as a motor. The air 85 is compressed by the compressor 76, is eventually introduced to the thermal control stack 116, and is exhausted inside the collection vessel 120. Subsequent to passing air through the thermal control stack 116, a suitable fuel is introduced to the thermal control stack 116, as illustrated in FIG. 1. The air and fuel inputs of the thermal control stack 116 can be controlled by the controller 174 to attain a prescribed heating rate of the vessel chamber 134, such as 250° C./hr. The heat generated by the thermal control stack 116 serves to heat the adjacent chemical converters 110 and/or 112 to the auto ignition temperature of the fuel. If desired, the energy system 70 can be maintained in this thermal stand-by mode until it is necessary to bring the chemical converters 110 and/or 112 up to an appropriate operating temperature. Also in this steady state condition, the purge gas can be turned off. The purge gas 100 can further enter the void formed between the insulation 139 and the vessel wall 136, FIG. 13, by diffusion or natural convection.

The chemical converter system 72 can be equipped for electrical generation with one or more fuel cells, together with one or more reformers; or for chemical production by employing only the reformers 110.

If desired, the controller 174 can continue to adjust the reactants introduced to the thermal control stack 116 in order to continue heating the chemical converters 110 and/or 112 up to or near the operational temperature thereof. Once the chemical converters 110 and/or 112 attains a temperature close to the normal operational temperature, typically 1000° C., the fuel cell 112 and reformer 110 can be actuated. For example, the fuel 90 exiting the compressor 98 can be intermingled or mixed with the steam generated by the HRSG 94 (for steam reforming) with the mixer 176 in order to produce a relatively simple fuel stock. The reformed fuel exiting the reformer 110 is then introduced with the compressed air 86 to the fuel cell 112 in order to start-up the fuel cell and to generate the required fuel cell power output. Alternatively, if oxidation reforming is preferred, the fuel entering the reformer 110 can be mixed with air, rather than water/steam to produce the relatively simple fuel stock. Once the chemical converter system 72 is operational, the fuel supplied to the thermal control stack 116 can be terminated, since the thermal control stack is no longer operating as a heat source. By passing only air through the stack at this juncture, the thermal control stack can operate as a heat collector or heat sink by removing waste heat from the fuel cell 112.

As described above, the illustrated chemical converter system 72 produces high temperature exhaust gas which is introduced to the turbine expander 78 of the gas turbine assembly 74. The turbine expander 78 adiabatically expands the high temperature fuel cell exhaust and then generates a turbine exhaust for subsequent use by the energy system 70. The turbine converts the thermal energy of the drive gas into rotary energy, which in turn rotates shaft 82 to generate alternating current electricity by the generator 84. This electricity can be combined with the electricity generated by the chemical converter system 72 for subsequent commercial or residential use.

During steady state operation, the primary air supply 85 sequentially passes through the compressor 76, and if desired the heat exchanger 188, into the fuel cell 112, for subsequent introduction to the gas turbine assembly 74. The energy system 70 also passes the turbine exhaust through the heat exchanger 188 in order to recoup the thermal energy present within the turbine exhaust. The thermal energy in the turbine exhaust preheats the reactant passing through the heat exchanger. For example, passing the air 85 through the heat exchanger 188 preheats the air by reclaiming waste heat present within the turbine exhaust. Similarly, the turbine exhaust is passed through the HRSG 94 in order to convert the water to steam prior to introduction to the reformer 110.

Those of ordinary skill will readily recognize that the chemical converter system 72, and in particular the fuel cell 112, can function as the combustor replacement for the gas turbine assembly 74. However, alternate embodiments are also contemplated by the present invention wherein the gas turbine assembly 74 can include a combustor and/or a recuperator as part of the gas turbine assembly. In system designs where the gas turbine assembly 74 includes its own internal combustor, a different start-up procedure can be employed in order to actuate the energy system 70. For example, the gas turbine assembly 74 can be actuated by any suitable start-up motor (not shown). The compressor 76 can therefore establish an air flow through the gas turbine assembly. The combustor of the gas turbine then receives fuel which reacts with the air according to a prescribed rate of heating. The thermal control stack is also configured to receive fuel from a fuel source, and to preheat the fuel cell 112 close to its operating temperature. The remaining operational functions of this alternate system arrangement are the same as for the energy system 70 described above.

In an alternate embodiment of the energy system 70 of the present invention, the illustrated energy system 70 can include an optional thermal jacket 190 disposed about the collection vessel 120. The term thermal jacket as used herein is intended to include any suitable structure that is adapted to mount about the collection vessel 120 and is adapted to exchange thermal energy therewith. The illustrated cooling jacket 190 is adapted to allow passage of a selected fluid, such as the air or water, therethrough. A compressor or blower is coupled to the thermal jacket 190 and is adapted to apply a selected pressure in order to draw or force the reforming agent through the cooling jacket 190. In this arrangement, the collection vessel 120 is cooled or heated, depending upon the particular application, by the air or water passing through the thermal jacket 190.

Figure 14:
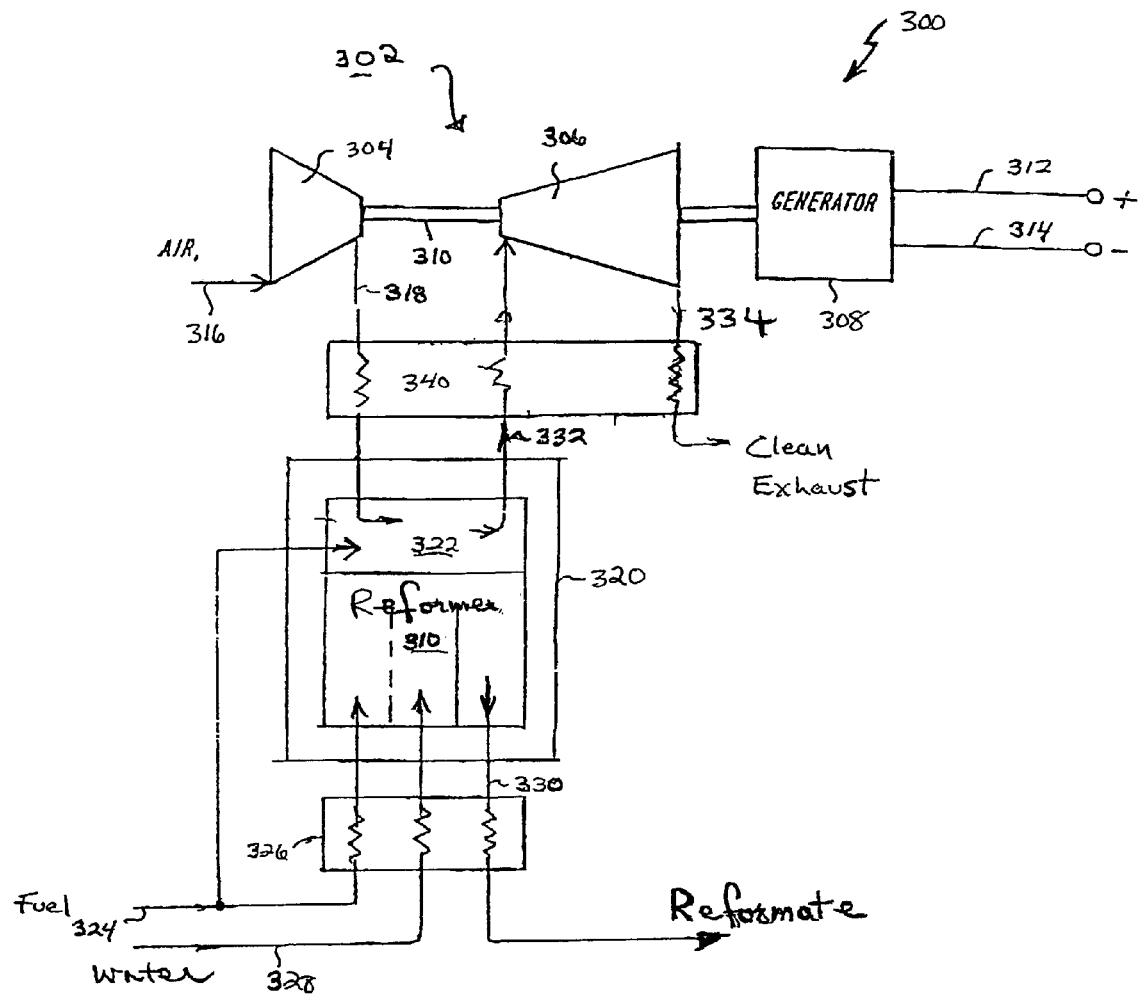
FIG. 14 is a schematic depiction of another embodiment of the energy system of the present invention.

FIG. 14 illustrates an alternate embodiment of the energy system according to the teachings of the present invention. The illustrated energy system 300 employs a gas turbine assembly 302 that includes a compressor 304, a turbine expander 306, and a generator 308, all mounted on a shaft 310 in a serial in-line aero-derivative configuration. Those of ordinary skill will readily recognize that the foregoing components can be arranged in various ways on the shaft 310. In the illustrated system 300, an input reactant, such as air 316, is introduced to the compressor 304 where it is compressed. The compressed air 318 is passed through a heat exchanger 340 and introduced to the collection vessel 320. Specifically, the heated compressed air is introduced to a combustor 322 along with another input reactant, such as the fuel 324. The combustor 322 can include any selected structure sufficient for allowing passage of one or more reactants or fluids, and for combusting fuel in the presence of oxygen. The thermal control stack 116 of FIGS. 1 and 8 through 11 are examples of a suitable combustor.

The illustrated collection vessel 320 further encloses a reformer 310 that is configured to receive, if desired, the fuel 324 after passing through a second heat exchanger 326. A reforming agent 328, such as water, also passes through the heat exchanger 326, and is then introduced to the reformer 310 within the collection vessel 320. The illustrated reforming agent 328 reforms the fuel 324 within the reformer 310 in order to produce a relatively pure fuel stock 330 that is discharged from the collection vessel 320. The reformed fuel then passes through the heat exchanger 326 in a regenerative fashion. The relatively pure fuel stock, also referred to as a reformate, can be transferred to a remote location for other uses, or can be further utilized within the illustrated energy system 300. For example, the fuel stock 330 can pass through the heat exchanger 326 to preheat the incoming fuel 324 and the water 328 when passing therethrough.

Similarly, the compressed air 318 exiting the combustor 322 can be collected within the collection vessel 320 and discharged therefrom to serve as the drive gas 332 for the turbine expander 306 of the gas turbine assembly 302. The flow 332 is converted into rotary energy by the turbine expander, and then converted to electricity by the generator 308. The electricity can be extracted via the electrical leads 312 and 314. The exhaust 334 from the turbine expander 306 and/or the flow 332 from the combustor 322 can be used to preheat the compressed air 318 prior to introduction to the combustor 322.

Those of ordinary skill will readily recognize that modifications to the systems illustrated above are contemplated by the teachings of the present invention. For example, the illustrated chemical converter system 72 of FIG. 1 can be disposed within the collection vessel 320 to form an energy assembly. The energy assembly can be incorporated into many different systems, such as an HVAC system of the type described in U.S. Pat. No. 5,948,221 and in U.S. Pat. No. 6,054,229, the contents of which are herein incorporated by reference.

Figure 15:
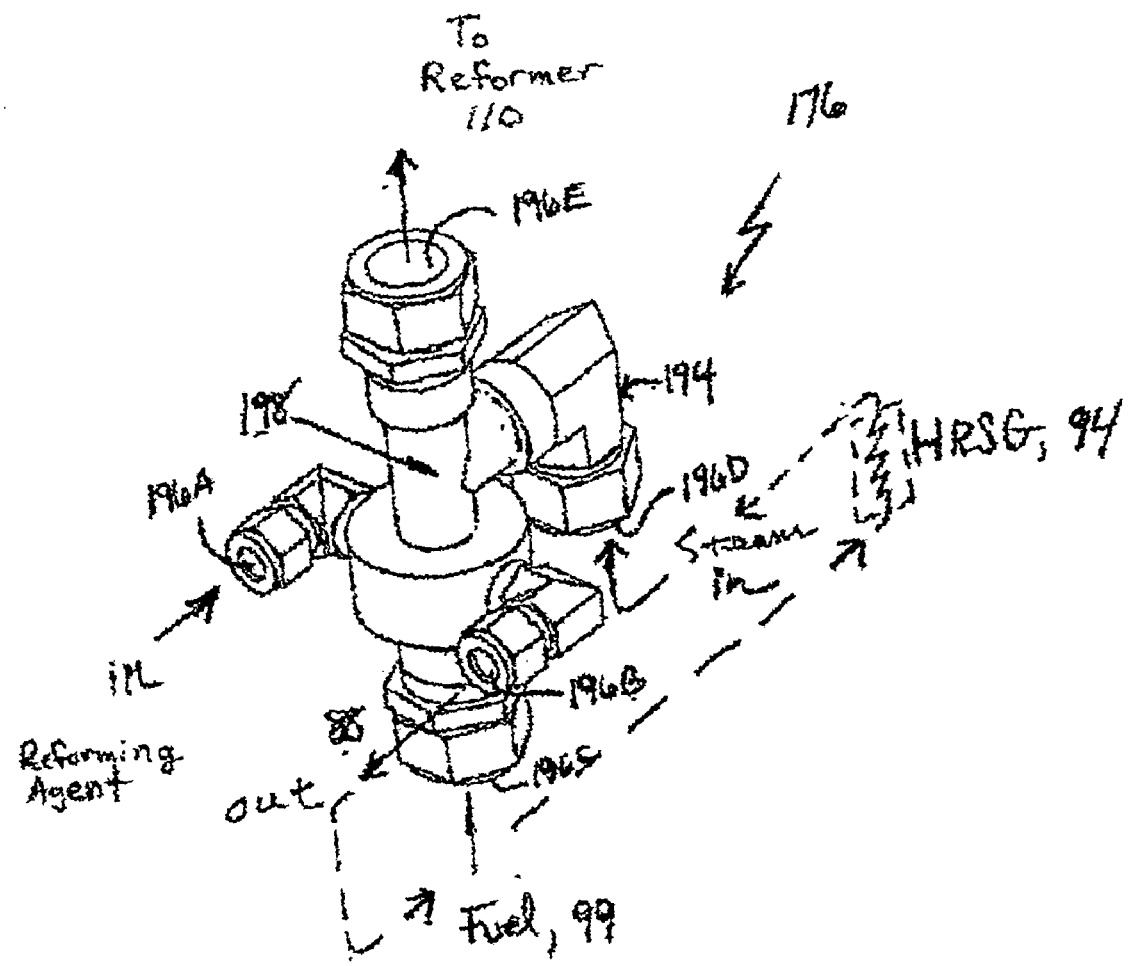
FIG. 15 is a schematic depiction of a mixer suitable for mixing a reforming agent and the fuel prior to introduction to the reformer of FIG. 1 according to the teachings of the present invention.

One embodiment of the mixer 176 of FIG. 1 suitable for use with the present invention is illustrated in FIG. 15. The illustrated mixer 176 includes a housing having a selected number of ports formed therein. For example, in a steam reforming process, the reforming agent water 88 is introduced to an inlet port 196A and exits through an outlet port 196B. The water is then introduced to the HRSG 94 where it is converted to steam, and then introduced to port 196D. The housing 194 further includes a port 196C for receiving the processed fuel 99a, or alternatively unprocessed fuel, which is mixed with the steam in the mixing region 198. The mixed steam and fuel then exits the mixer through port 196E. The water 88 circulating through the mixer is separated or isolated from the steam and fuel, and serves to form a cooling zone adjacent the mixing zone 198 to provide a selected degree of cooling to prevent, minimize, reduce or inhibit the unwanted pyrolisis of fuel when passing through the mixer 176. Those of ordinary skill will recognize that although the mixer is illustrated as being mounted within the collection vessel, other locations can also be employed, such as locations outside of the collection vessel, provided the mixer is coupled so as to receive the reforming agent and a fuel reactant. Those of ordinary skill will also recognize that the illustrated mixer can be adapted or arranged to mix the fuel with an oxidant, such as air, in an oxidation reforming process; and to mix the fuel with oxidant and steam in an autothermal reforming process. According to this regime, selected cooling may not be necessary.

Figure 16:
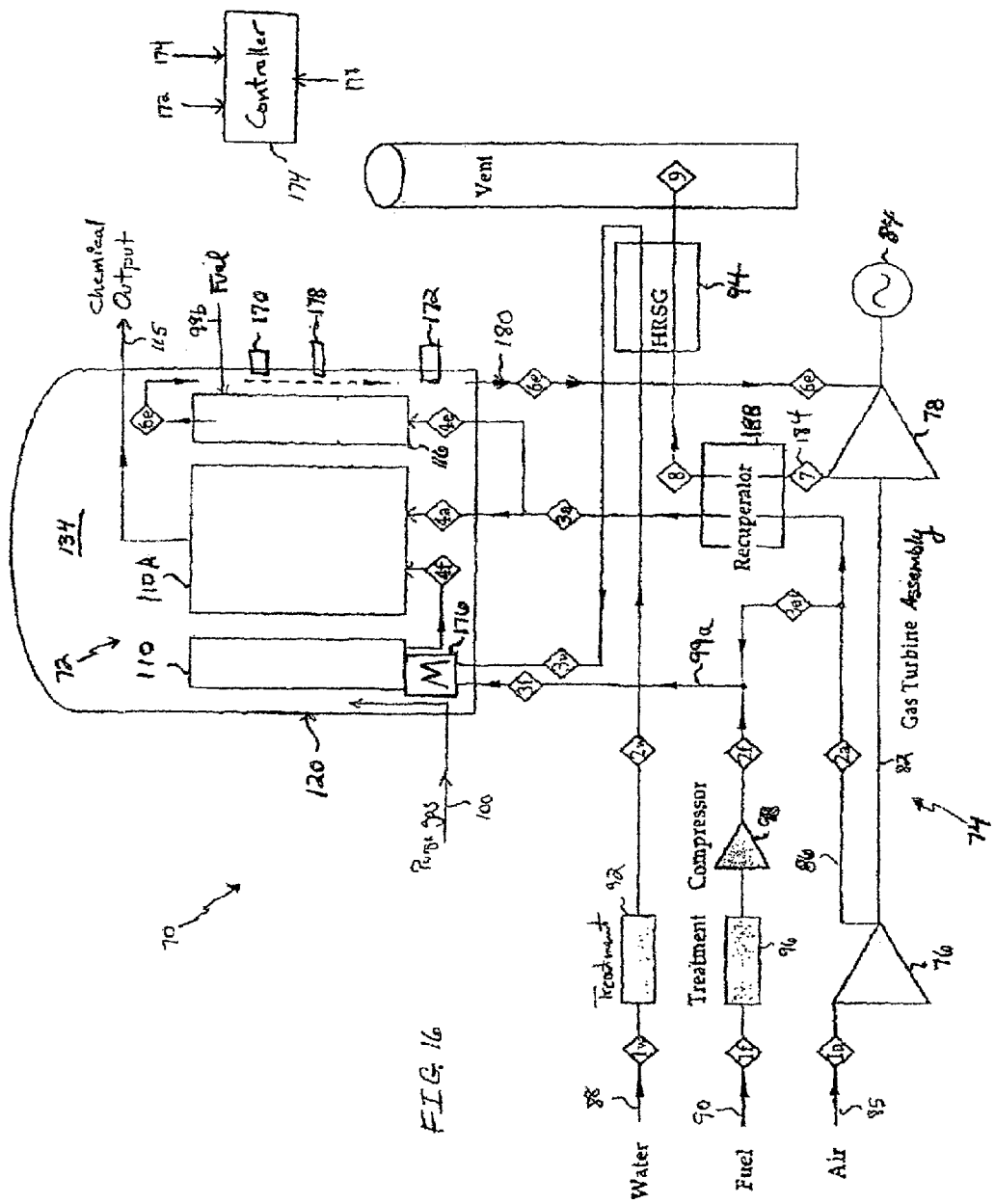
FIG. 16 is a schematic block diagram of one embodiment of an energy system mounting a fuel processor, reformer and thermal control stack within a collection vessel, and employing a plurality of sensors for ensuring operational safety of the system during use.

FIG. 16 illustrates an alternate embodiment of the energy system 70 of the present invention. Like reference numerals designate like parts throughout. The illustrated energy system 70 includes a chemical converter system 72 mounted within a collection vessel 120. The chemical converter system 72 includes a fuel reforming converter 110 and a finishing reforming converter 110A. The reformer 110 reforms the fuel in the presence of a reforming agent, such as air and/or water, to produce a relatively pure fuel stock.

In the illustrated embodiment, the chemical converters 110 and 110A can reform the fuel in the presence of air according to an oxidation reforming process. Those of ordinary skill will recognize that the water reforming agent or the mixture of air and water can be used instead of air. The reformer produces a reformate or chemical output or stock 115 that can be removed from the collection vessel 120. The illustrated energy system 70 also provides for selected sensors coupled to or disposed relative to the housing for ensuring proper operational of the energy system.

In operation, the illustrated energy system 70 introduces a pair of system reactants, such as the fuel 90 and air 85, to the system. The air 85 is compressed by a compressor 76 to form a pressurized, compressed air 86, that is optionally introduced to the heat exchanger 188 where it is regeneratively or recuperatively heated by the turbine exhaust 184 exiting the turbine expander 78 and passing therethrough, prior to introduction to the thermal control stack 116 and the chemical converters 110 and 110A, where it functions as a reforming agent for the fuel 90 in oxidation reforming regimes.

The input fuel 90 is first passed through a first preprocessing stage 96, such as a desulphurization unit, and is then introduced to a compressor 98, where the fuel is compressed. The input fuel is then introduced to the chemical converters 110 and 110A where it is reformed in the presence of water and/or air, and the reformate exits at the chemical output port 115.

An input reforming agent, such as water 88, is introduced to a processing unit 92. The illustrated processing unit can be a de-ionization unit that removes ions from the water. The water is then passed through a heat recovery steam generator 94 where it is converted to steam by the heat associated with the chemical convert system 72 or with the turbine exhaust 184 passing therethrough. The steam can then be introduced to the mixer 176 if desired, instead of air, where it functions as the reforming agent in order to facilitate reformation of the input fuel in steam reforming regimes. The illustrated converters 110 and 110A reform the fuel and produces a relatively pure fuel stock, which can be removed from the vessel 120 for use remote from the system at the output port 115, or for use elsewhere in the system.

Similarly, a thermal control stack 116 is disposed within the collection vessel 120 and adapted to function as a heat source during start-up operation or as a heat control device during steady state operation, as described above. The illustrated thermal control stack 116 is adapted to receive air and fuel depending upon the particular system operation. The thermal control stack 116 produces exhaust which is collected within the collection vessel 120 along with the exhaust generated by the converter 110. The collected exhaust 180 is discharged from the collection vessel 120 and is introduced to a turbine expander 78, which forms part of the gas turbine assembly 74. The exhaust is converted by the turbine expander into rotary energy, which is converted into electricity. The turbine exhaust 184 exiting the turbine expander passes through the heat exchanger 188 and the heat recovery steam generator 94 in order to preheat a selected system fluids.

The operational safety of the energy system 70 can be monitored by the sensors 170, 172 and 178. The sensor 170, which can be a UV or IR sensor, can be coupled to the collection vessel or relative to the vessel to monitor, sense or detect the presence or absence of a selected thermal condition of the thermal control stack, such as a flame, in order to ensure that fuel is being properly consumed.

The energy system 70 can further employ a gas sensor 172, such as an oxygen sensor, to ensure that an adequate oxygen level or concentration exists within the vessel chamber to prevent, inhibit or eliminate a hazardous or dangerous accumulation of unburned, combustible fuel. This ensures that an adequate and proper amount of oxygen exists in the chamber. The sensor 178 senses the temperature within the vessel.

One or more elements of the energy system 70 as shown in FIGS. 1 and 16 can be reconfigured to form a thermal plant. For example, when the fuel supply 99a and the mixer 176 are eliminated, fuel 99b is supplied to the thermal control stack and the fuel reforming converter 110 and the finishing reforming converter 110A can function as a steam generator and super heater. In this case, the output 115 is a conditioned thermal medium. As used herein, the term thermal plant is intended to include any structure suitable for producing a conditioned thermal medium. Examples of suitable thermal plants include a vapor generator, steam boiler, thermal fluid heater (hydronics), gaseous medium heater, and superheaters. When employing a thermal plant, the illustrated system can process and provide:

1) pressurized, saturated or superheated vapor, such as steam,
2) hot thermal fluid in hydronic applications, or
3) hot gas medium, such as air.

Superheated vapor, hot thermal fluid and hot gas have many commercial or industrial uses in addition to coupling with steam turbines or gas turbines for power generation.

Figure 17:
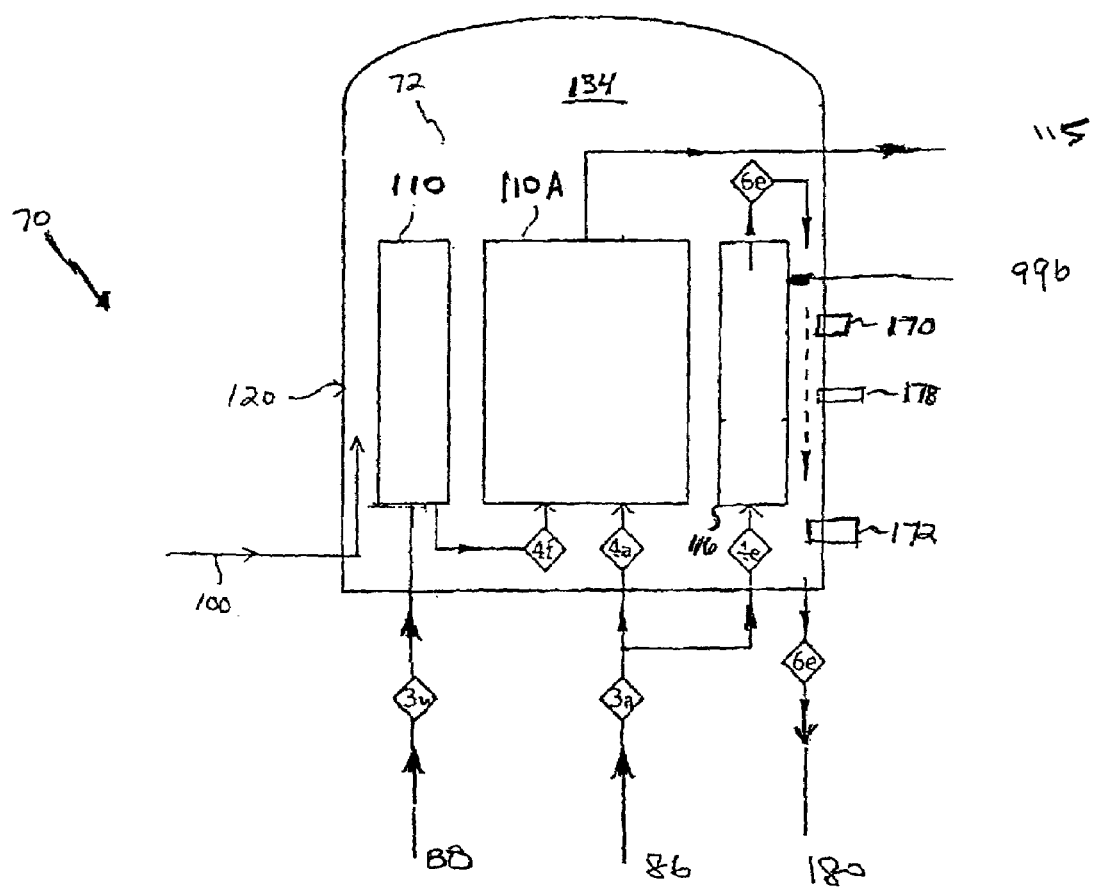
FIG. 17 is a schematic diagram of a portion of a thermal plant which may be optionally coupled with conventional devices for power generation, thermal applications or direct consumption of the output thermal medium.

FIG. 17 shows a portion of a thermal plant which can be coupled with a variety of energy devices such as steam turbines or gas turbines for power generation; heat exchangers for thermal applications; or adapters for the direct consumption of the conditioned thermal medium.

Those of ordinary skill will readily recognize that the chemical converter system can be arranged to include any suitable number or combination of the components described above, including the fuel cell, reformer, thermal control stack, reforming converter, and thermal plant. Likewise, the system 72 can include only one or more of these components, as contemplated by the present invention.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover generic and specific features of the invention described herein, and all statements of the scope of the invention which, as a matter of language, might be said to fall therebetween.

Having described the invention, what is claimed as new and desired to be secured by Letters Patent is:

1. An energy system for producing at least one of electricity, chemical stock, and a conditioned thermal medium, comprising
   a collection vessel,
   one or more converters disposed within the collection vessel,
   a thermal control stack in thermal communication with the chemical converter and disposed within the collection vessel, wherein at least one of said converter and said thermal control stack generates exhaust, and said collection vessel is adapted to collect the exhaust, and one or more sensors coupled to the collection vessel for monitoring a parameter of the exhaust to ensure safe operation of the system.

2. The energy system of claim 1, wherein said converter comprises an electrochemical converter.

3. The energy system of claim 2, wherein said electrochemical converter comprises one of a solid oxide fuel cell, a molten carbonate fuel cell, a phosphoric acid fuel cell, an alkaline fuel cell, and a proton exchange membrane fuel cell.

4. The energy system of claim 1, wherein said converter comprises a chemical converter.

5. The energy system of claim 4, wherein said chemical converter comprises a reformer.

6. The energy system of claim 4, wherein said chemical converter comprises one of a steam reformer, partial oxidation reformer, autothermal reformer, and aerothermal reformer.

7. The energy system of claim 1, wherein said converter comprises a thermal converter.

8. The energy system of claim 7, wherein said thermal converter comprises one of a vapor generator, vapor superheater, thermal fluid hydronic heater, and gaseous medium heater.

9. The energy system of claim 1, further comprising a plurality of converters including at least one chemical reactor, one electrochemical reactor, and one thermal converter.

10. The energy system of claim 1, wherein said sensor comprises a UV sensor.

11. The energy system of claim 1, wherein said sensor comprises an IR sensor.

12. The energy system of claim 1, wherein said sensor comprises a gas sensor.

13. The energy system of claim 1, wherein said sensor comprises an oxygen sensor.

14. The energy system of claim 1, further comprising a plurality of sensors including a gas sensor and at least one of a UV sensor and an IR sensor.

15. The energy system of claim 1, wherein the converter is adapted to operate at temperatures up to about 1500° C. and pressures up to about 1500 psi.

16. The energy system of claim 1, wherein the converter comprises a reformer, said reformer including a carrier having a catalyst material disposed thereon for reforming a fuel.

17. The energy system of claim 1, wherein the converter comprises a fuel cell, said fuel cell including an electrolyte having electrode material disposed thereon for electrochemically converting a fuel into electricity.

18. The energy system of claim 1, wherein said thermal control stack is adapted to operate as a heat source or a heat sink.

19. The energy system of claim 1, wherein said sensor comprises an oxygen sensor for sensing the oxygen within exhaust collected within the collection vessel.

20. The energy system of claim 1, wherein said sensor comprises at least one of a thermocouple, thermostat or IR sensor for sensing a thermal condition of the thermal control stack.

21. The energy system of claim 20, wherein said IR sensor detects whether a flame is present in the thermal control stack when operating as a burner.

22. The energy system of claim 1, wherein said sensor comprises a UV sensor for sensing a thermal condition of the thermal control stack.

23. The energy system of claim 22, wherein said UV sensor detects the thermal energy of the thermal control stack.

24. The energy system of claim 1, wherein said collection vessel further comprises an inlet for introducing a purge gas thereto.

25. The energy system of claim 1, further comprising means for purging a chamber of said collection vessel of a selected fluid.

26. The energy system of claim 1, wherein said collection vessel comprises an outer housing forming a chamber and insulation disposed within the chamber forming an isolation void between the housing and the insulation, said system further comprising means for purging the chamber and the isolation void of a selected fluid.

27. The energy system of claim 1, wherein said converter operates both as a fuel cell and as a reformer.

28. The energy system of claim 1, further comprising a controller coupled to the sensor and to delivery means for controlling delivery of reactants to the collection vessel based on an output signal from the sensor.

29. The energy system of claim 1, further comprising delivery means for delivering a reactant to one of the converter and the thermal control stack, said reactant including at least one of a reforming agent, fuel reactant, and oxidizer reactant.

30. The energy system of claim 29, wherein said reforming agent comprises at least one of water, oxygen, air and $CO_2$.

31. The energy system of claim 1, further comprising delivery means for delivering reactants to the converter or the thermal control stack.

32. The energy system of claim 1, wherein the converter and the thermal control stack produce exhaust, further comprising means for delivering said exhaust to a bottoming device.

33. The energy system of claim 1, further comprising a gas turbine assembly fluidly coupled to said collection vessel.

34. The energy system of claim 33, wherein the converter and the thermal control stack produce exhaust and said collection vessel collects said exhaust, said exhaust forming the drive gas for the gas turbine assembly.

35. The energy system of claim 1, wherein said sensor comprises a temperature sensor.

36. The energy system of claim 1, further comprising a mixer for mixing one or more reactants with a reforming agent prior to introduction to the converter.

37. The energy system of claim 36, wherein said mixer comprises a housing having a plurality of ports formed therein.

38. The energy system of claim 37, wherein said ports are adapted to mix said reactant and said reforming agent within a mixing zone within the housing to from reforming mixture.

39. The energy system of claim 38, wherein said mixer is adapted to mix fuel and steam within said mixing zone, said mixer including a port for discharging said reforming mixture.

40. The energy system of claim 39, wherein a pair of said plurality of ports is adapted to receive and to discharge a fluid to form a cooling zone adjacent said mixing zone, said fluid being separated from said reactant and said reforming agent forming said reforming mixture.

41. The energy system of claim 1, wherein said converter comprises a plate-type reformer for reforming a reactant into reaction species during operation, said reformer including a plurality of catalyst plates having associated therewith one or more catalyst materials for promoting reformation and a plurality of conductive plates formed of a thermally conducting material, said catalyst plates and said conductive plates being alternately stacked to form a reforming structure, the conductive plates conductively transferring heat energy in-plane to support a reforming process.

42. The energy system of claim 41, wherein said reforming process includes one or more reforming reactions, said reforming reactions including a catalytically assisted chemical reaction between two or more reaction species, and a catalytically assisted thermal dissociation of a single species.

43. The energy system of claim 41, wherein said reforming structure includes at least one axial manifold for introducing the reactant thereto and at least one manifold for allowing the reaction species to exit from the reforming structure.

44. The energy system of claim 41, wherein said reforming structure has an exposed peripheral surface for exchanging heat energy with an external environment.

45. The energy system of claim 41, wherein said reforming structure includes at least one axial reactant manifold for introducing the reactant thereto and peripheral exhaust means for exhausting the reaction species from a peripheral portion of the reforming structure.

46. The energy system of claim 41, further comprising
a thermally conductive, gas-tight housing disposed about the stacked reforming structure to form a peripheral axial manifold, and
means for allowing the reaction species to enter the peripheral axial manifold, wherein the reaction species is captured by the gas-tight housing.

47. The energy system of claim 41, further comprising a thermally conductive, gas-tight housing having means for exchanging heat energy with the external environment and said conductive plate by one of radiation, conduction and convection.

48. The energy system of claim 41, wherein an outer surface of the reforming structure contacts an inner surface of a gas-tight housing, said gas-tight housing being capable of conductively transferring heat energy to the conductive plates.

49. The energy system of claim 41, further comprising a gas-tight enclosure of cylindrical configuration for permitting pressurized reformer operation.

50. The energy system of claim 41, wherein the conductive plate includes means for providing a generally isothermal condition, in plane of the conductive plate.

51. The energy system of claim 41, wherein said reforming structure includes at least one axial reactant manifold for introducing the reactant thereto, and wherein the conductive plates includes extension means integrally formed thereon and extending into the axial reactant manifold for preheating an incoming reactant.

52. The energy system of claim 41, wherein at least one of the conductive plate and the catalyst plate includes an in-plane surface having passage means for allowing the reactant to flow over the surface of the plate.

53. The energy system of claim 41, further comprising
an axial manifold formed within the reforming structure,
passage means formed between the conductive plate and the catalyst plate, and
means for generating a reactant flow pressure drop through the passage means between the conductive plate and the catalyst plate that is substantially greater than the reactant flow pressure drop within the axial manifold.

54. The energy system of claim 41, further comprising a passage formed between the catalyst and conductive plates for allowing an incoming reactant to pass over a surface of one of the plates, said passage maintaining a substantially uniform pressure drop to provide for a substantially uniform flow of reactants along an axis of the reforming structure.

55. The energy system of claim 41, further comprising means for producing a substantially uniform temperature condition along an axis of the reforming structure.

56. The energy system of claim 41, wherein the catalyst plate is formed of a porous catalyst material, the porous material forming passage means for allowing an incoming reactant to pass through at least a portion of the plate.

57. The energy system of claim 41, wherein the thermally conductive plate is formed of a porous conductive material, the porous material forming passage means for allowing an incoming reactant to pass through the plate.

58. The energy system of claim 41, wherein the conductive plate is composed of at least one of a nonmetal such as silicon carbide, and a composite material.

59. The energy system of claim 41, wherein the conductive plate is composed of at least one metal such as aluminum, copper, iron, steel alloys, nickel, nickel alloys, chromium, chromium alloys, platinum, and platinum alloys.

60. The energy system of claim 41, wherein the catalyst plate is composed of a ceramic support plate having the catalyst material coating.

61. The energy system of claim 41, wherein the catalyst plate is composed of a metallic support plate having the catalyst material coating.

62. The energy system of claim 41, wherein the catalyst material is selected from the group consisting of platinum, palladium, nickel, nickel oxide, iron, iron oxide, chromium, chromium oxide, cobalt, cobalt oxide, copper, copper oxide, zinc, zinc oxide, molybdenum, molybdenum oxide, and other suitable transition metals and their oxides.

63. The energy system of claim 41, wherein the catalyst plate is composed of at least one of platinum, nickel, nickel oxide, chromium and chromium oxide.

64. The energy system of claim 41, wherein the reactant includes a hydrocarbon species, and at least one of $O_2$, $H_2O$ and $CO_2$.

65. The energy system of claim 64, wherein the hydrocarbon fuel and at least one of $H_2O$ and $CO_2$ undergo an endothermic catalytic reformation to produce $H_2$, CO, $H_2O$ and $CO_2$, the energy requirements for the endothermic reforming being supplied by energy produced by an external fuel cell, said energy being transferred from the fuel cell by the conducting plate through in-plane thermal conduction.

66. The energy system of claim 64, wherein the hydrocarbon fuel and $O_2$ undergo catalytic combustion and reformation to produce $H_2$, CO, $H_2$ and $CO_2$, and at least one of an exothermic combustion and an exothermic reaction of an external fuel cell supplementing the energy requirements for the endothermic reforming through the in-plane thermal conduction of the conducting plate.

67. The energy system of claim 41, wherein the reactant includes at least one of an alkane (paraffin hydrocarbon), a hydrocarbon bonded with alcohol (hydroxyl), a hydrocarbon bonded with a carboxyl, a hydrocarbon bonded with a carbonyl, an alkene (olifin hydrocarbon), a hydrocarbon bonded with an ether, a hydrocarbon bonded with an ester, a hydrocarbon bonded with an nine, a hydrocarbon bonded with an aromatic derivative, and a hydrocarbon bonded with another organo-derivative.

68. The energy system of claim 64 or 67, wherein the hydrocarbon fuel and $O_2$ undergo catalytic combustion with the presence of steam and reformation to produce $H_2$, CO, $H_2O$ and $CO_2$.

69. The energy system of claim 64 or 67, wherein the CO and $H_2O$ undergo catalytic shift reaction to form $CO_2$ and $H_2$.

70. The energy system of claim 41, further comprising means for coupling the reaction species exiting the reformer to an external fuel cell.

71. The energy system of claim 41, wherein the reforming structure has a substantially cylindrical shape.

72. The energy system of claim 41, wherein the reforming structure is cylindrical and at least one of the catalyst plate and the conductive plate has a diameter between about 1 inch and about 20 inches, and has a thickness between about 0.002 inch and about 0.2 inch.

73. The energy system of claim 41, wherein the reforming structure has a substantially rectangular shape, through the manifolds attached to the sides of which the reactants are introduced and exhausted.

74. The energy system of claim 1, wherein said converter comprises a reformer for reforming a reactant into reaction species during operation, said reformer including a porous and thermally conductive material interspersed with one or more catalyst materials to form a reforming structure, the thermally conductive material transferring heat energy to support the reforming process.

75. The energy system of claim 74, wherein said reforming structure includes passage means for allowing a reactant to flow through the structure.

76. The energy system of claim 75, wherein the passage means maintains a substantially uniform pressure drop to provide for a substantially uniform flow of reactants along an axis of the reforming structure.

77. The energy system of claim 41 or 74, wherein said reforming structure extends, in one orientation, along an axis, and wherein said reforming structure includes at least one axial manifold for introducing the reactant thereto.

78. The energy system of claim 41 or 74, wherein said reforming structure comprises peripheral exhaust means for exhausting the reaction species from a peripheral portion of the reforming structure.

79. The energy system of claim 1, wherein said converter comprises a plate-type reformer for reforming a reactant into reaction species during operation, said reformer including a plurality of plates composed of a thermally conductive material interspersed with one or more catalyst materials for promoting the reforming process, said plates being stacked together to form a reforming structure, the plates conductively transferring heat energy in-plane of the plates to support the reforming process.

80. The energy system of claim 74 or 79, wherein said reforming structure includes at least one axial manifold for introducing the reactant thereto and at least one manifold for allowing the reaction species to exit from the reforming structure.

81. The energy system of claim 74 or 79, wherein said reforming structure has an exposed peripheral surface for exchanging heat energy with an external environment.

82. The energy system of claim 74 or 79, wherein said reforming structure includes at least one axial reactant manifold for introducing the reactant thereto and peripheral exhaust means for exhausting the reaction species from a peripheral portion of the reforming structure.

83. The energy system of claim 74 or 79, further comprising a thermally conductive, gas-tight housing disposed about the reforming structure to form a peripheral axial manifold, and means for allowing the reaction species to enter the peripheral axial manifold, wherein the reaction species is captured by the gas-tight housing.

84. The energy system of claim 74 or 79, further comprising a thermally conductive, gas-tight housing having means for exchanging heat energy with the external environment and said reforming structure by one of radiation, conduction and convection.

85. The energy system of claim 74 or 79, wherein an outer surface of the reforming structure contacts an inner surface of a gas-tight housing, said gas-tight housing being capable of conductively transferring heat energy to the reforming structure.

86. The energy system of claim 74 or 79, further comprising a gas-tight enclosure of cylindrical configuration for permitting pressurized reformer operation.

87. The energy system of claim 74 or 79, wherein the reforming structure includes means for providing a generally isothermal condition through said reforming structure.

88. The energy system of claim 74 or 79, wherein said reforming structure includes at least one axial reactant manifold for introducing a reactant thereto, and wherein the reforming structure includes extension means integrally formed therewith and extending into the axial reactant manifold for preheating the reactant.

89. The energy system of claim 74 or 79, further comprising an axial manifold formed within the reforming structure, reactant passage means for allowing a reactant to flow in-plane of the reforming structure, and means for generating a reactant flow pressure drop through the passage means that is substantially greater than the reactant flow pressure drop within the axial manifold.

90. The energy system of claim 74 or 79, further comprising means for producing a substantially uniform temperature condition along an axis of the reforming structure.

91. The energy system of claim 74 or 79, wherein the conductive material is composed of at least one of a non-metal such as silicon carbide, and a composite material.

92. The energy system of claim 74 or 79, wherein the conductive material is composed of at least one metal such as aluminum, copper, iron, steel alloys, nickel, nickel alloys, chromium, chromium alloys, platinum, platinum alloys, and other refractory metals.

93. The energy system of claim 74 or 79, wherein the catalyst material is selected from the group consisting of platinum, palladium, nickel, nickel oxide, iron, iron oxide, chromium, chromium oxide, cobalt, cobalt oxide, copper, copper oxide, zinc, zinc oxide, molybdenum, molybdenum oxide, other transition metals and their oxides.

94. The energy system of claim 74 or 79, wherein the reactant includes a hydrocarbon species, and at least one of $O_2$, $H_2O$ and $CO_2$.

95. The energy system of claim 74 or 79, further comprising means for coupling the reaction species exiting the reformer to an external fuel cell.

96. The energy system of claim 74 or 79, wherein the reactant includes a hydrocarbon fuel and at least one of $H_2O$ and $CO_2$ which undergo catalytic reformation to produce $H_2$, CO, $H_2O$ and $CO_2$, and wherein an exothermic reaction of an external fuel cell supplements the energy requirements for the endothermic reforming reaction of the reforming structure through the thermally conductive material.

97. The energy system of claim 74 or 79, wherein the reactant includes a hydrocarbon fuel and $O_2$ which undergo catalytic combustion and reformation to produce $H_2$, CO, $H_2O$ and $CO_2$, and at least one of an exothermic combustion and an exothermic reaction of an external fuel cell supplements the energy requirements for the endothermic reforming reaction of the reforming structure through the thermally conductive material.

98. The energy system of claim 74 or 79, wherein the reactant includes a hydrocarbon fuel and $O_2$ which undergo catalytic combustion with the presence of $H_2O$ and reformation to produce $H_2$, CO, $H_2O$ and $CO_2$.

99. The energy system of claim 74 or 79, wherein the reforming structure has a substantially cylindrical shape.

100. The energy system of claim 74 or 79, wherein the reforming structure is cylindrical and has a diameter between about 1 inch and about 20 inches.

101. The energy system of claim 74 or 79, wherein the reforming structure has a substantially rectangular shape, though the manifolds attached to the sides of which the reactants are introduced and exhausted.

102. The energy system of claim 1, where said thermal control stack is adapted for oxidizing a hydrocarbon fuel to produce heat energy, said thermal control stack comprising:
   a plurality of conductive plates formed of a thermally conductive material and a plurality of catalyst plates having one or more oxidizing catalyst materials, said catalyst plates and said conductive plates being alternately stacked to form a burner structure;
   wherein the catalyst material of the catalyst plate promotes the oxidation of the hydrocarbon fuel to form a resultant species; and
   wherein the conductive plates are capable of transferring heat energy produced during the oxidation process to the surrounding medium by one of radiation, conduction and convection.

103. The energy system of claim 102, wherein the thermal control stack has an exposed peripheral surface for exchanging heat energy with an external environment.

104. The energy system of claim 102, wherein the thermal control stack includes at least one axial reactant manifold for introducing the reactant thereto and peripheral exhaust means for exhausting the reaction species from a peripheral portion of the stack structure.

105. The energy system of claim 102, further comprising a thermally conductive housing disposed about the thermal control stack and having means for exchanging heat energy with the external environment and said conductive plate by one of radiation, conduction and convection.

106. The energy system of claim 102, wherein an outer surface of the thermal control stack contacts an inner surface of a thermally conductive housing disposed about the thermal control stack, said housing conductively transferring heat energy from the conductive plates during operation.

107. The energy system of claim 102, wherein the conductive plate includes means for providing a generally isothermal condition, in plane of the conductive plate.

108. The energy system of claim 102, wherein said thermal control stack includes least one axial reactant manifold for introducing the reactant thereto, and wherein the conductive plates include extension means integrally formed thereon and extending into the axial reactant manifold for preheating the hydrocarbon fuel.

109. The energy system of claim 102, wherein an in-plane surface of at least one of the conductive plate and the catalyst plate includes passage means for allowing the hydrocarbon fuel to flow over the surface of the plate.

110. The energy system of claim 109, wherein the passage means maintains a substantially uniform pressure drop to provide for a substantially uniform flow of reactants along an axis of the thermal control stack.

111. The energy system of claim 109, wherein the catalyst plate is formed of a porous catalyst material, the porous material forming the passage means and allowing the reactant to pass through the plate.

112. The energy system of claim 109, wherein the thermally conductive plate is formed of a porous conductive material, the porous material forming the passage means and allowing the reactant to pass through the plate.

113. The energy system of claim 102, further comprising
   an axial manifold formed within the thermal control stack,
   passage means formed in an in-plane surface of one of the conductive plate and the catalyst plate for allowing the fuel to flow over the surface of the plate, and
   means for generating a reactant flow pressure drop through the passage means that is substantially greater than the reactant flow pressure drop within the axial manifold.

114. The energy system of claim 102, further comprising means for producing a substantially uniform temperature condition along an outer surface of the thermal control stack.

115. The energy system of claim 102, wherein the conductive plate is composed of silicon carbide.

116. The energy system of claim 102, wherein the conductive plate is composed of at least one refractory metal.

117. The energy system of claim 102, wherein the catalyst plate is composed of a ceramic support plate having the catalyst material coated thereon.

118. The energy system of claim 117, wherein the catalyst material is selected from the group consisting of at least one of platinum, nickel, nickel oxide, chromium and chromium oxide.

119. The energy system of claim 102, wherein the catalyst plate is composed of at least one of platinum, nickel, nickel oxide, chromium and chromium oxide.

120. The energy system of claim 102, wherein the hydrocarbon fuel, is pre-mixed with an oxidizer reactant prior to introduction to or within the axial manifold.

121. The energy system of claim 102, wherein the thermal control stack has a substantially cylindrical shape.

122. The energy system of claim 102, wherein the thermal control stack is cylindrical and at least one of the catalyst plate and the conductive plate has a diameter between about 1 inch and about 20 inches, and has a thickness between about 0.002 inch and about 0.2 inch.

123. The energy system of claim 1, wherein the thermal control stack comprises
   a porous and thermally conductive material interspersed with one or more catalyst materials to form a burner structure,
   wherein the catalyst material promotes the oxidation of the hydrocarbon fuel to form a resultant species, and
   wherein the conductive material is capable of transferring heat energy produced during the oxidation process to the surrounding medium by one of radiation, conduction and convection.

124. The energy system of claim 1, wherein the thermal control stack comprises
   a plurality of plates composed of a thermally conductive material interspersed with one or more catalyst materials, said plates being stacked together to form a burner structure,
   wherein the catalyst material promotes the oxidation of the hydrocarbon fuel to form a resultant species, and wherein the conductive material transferring heat energy produced during the oxidation process to the surrounding medium by one of radiation, conduction and convection.

125. The energy system of claim 1, wherein said converter comprises a plate-type electrochemical converter having:
a plurality of gas-tight electrolyte plates having reactive materials disposed on both sides thereof, said plates having a fuel flow side and having the reactive material disposed thereon selected from the group consisting of at least one of a combustion catalyst, a reforming catalyst, a shift catalyst and a fuel electrode material,
said plates having an oxidant flow having the reactive material disposed thereon selected from the group consisting of an oxidant electrode material,
a plurality of gas-tight conductive plates formed of a thermally conductive material; said electrolyte plates and said conductive plates being alternately stacked together to form a stacked plate assembly, and
internal reforming means for preheating and reforming a hydrocarbon fuel on the fuel flow side of the electrolyte plate within the stacked plate assembly, said reforming being assisted by the conductive plates which are capable of conductively transferring heat from a fuel cell reaction portion of the stacked plate assembly.

126. The energy system of claim 125, wherein the electrolyte plate performs an electrolytic ionic transfer function, such as transferring oxygen ions.

127. The energy system of claim 125, wherein the converter performs chemical transformation and production while consuming oxygen to produce electricity.

128. The energy system of claim 125, wherein a side of the conductive plate faces the fuel flow side having disposed thereon at least one of the combustion catalyst, the reforming catalyst and the shift catalyst.

129. The energy system of claim 125, wherein at least one of the combustion catalyst, the reforming catalyst and the shift catalyst can be applied on a flow adjustment element, said flow adjustment element being situated between the electrolyte plate and the conductive plate.

130. The energy system of claim 125, further comprising a plurality of axial manifolds formed in the stacked plate assembly, at least one of the manifolds being adapted to receive a hydrocarbon fuel reactant and to allow the fuel to flow over one surface of the electrolyte plate and to exit at the external edge of the plates; and at least one other of said manifolds being adapted to receive an oxidizer reactant and to allow the oxidizer flow over the other side of the electrolyte plate and to exit at the external edge of the plates.

131. The energy system of claim 130, wherein said manifolds providing means for regulating the uniform flow distribution into the spaces between the plates along the axis of the stacked assembly to provide an axially isothermal condition.

132. The energy system of claim 125, wherein the stacked plate assembly has a rectangular configuration with an edge that is adapted to receive a hydrocarbon fuel reactant, said reactant flowing into the space over one surface of the electrolyte plates and exits from an opposing plate edge; and the third plate edge being adapted to receive an oxidizer reactant that flows into a space over the other surface of the electrolyte plate and exits from a fourth plate edge.

133. The energy system of claim 125, wherein said conducting plates include means for regulating the in-plane temperature distribution of the stacked plate assembly to attain a substantially in-plane isothermal condition.

134. The energy system of claim 125, wherein the thermally conductive material of the conductive plate is composed of at least a nonmetal, including silicon carbide.

135. The energy system of claim 125, wherein the thermally conductive plate is composed of at least one of nickel, nickel alloys, chromium, chromium alloys, platinum, and platinum alloys.

136. The energy system of claim 125, wherein the thermally conductive plate is composed of at least one of aluminum, copper, iron, and steel alloys.

137. The energy system of claim 125, wherein the fuel electrode is composed of at least one of nickel, a nickel containing compound, chromium and chromium containing compound.

138. The energy system of claim 125, wherein the combustion catalyst is composed of at least one of a platinum, platinum containing compound, nickel and nickel containing compound.

139. The energy system of claim 125, wherein the reforming catalyst is composed of at least one of a nickel, a nickel containing compound, chromium and a chromium containing compound.

140. The energy system of claim 125, wherein the reforming catalyst is composed of at least one of platinum, palladium, nickel, nickel oxide, iron, iron oxide, chromium, chromium oxide, cobalt, cobalt oxide, copper, copper oxide, zinc, zinc oxide, molybdenum, and molybdenum oxide.

141. The energy system of claim 125, wherein partial oxidation occurs over the combustion catalyst fanned on the surface of at least one of the electrolyte plate and the conductive plate.

142. The energy system of claim 125, wherein the internal reforming reaction occurs over the reforming catalyst on the surface of at least one of the electrolyte plate and the conductive plate.

143. The energy system of claim 125, wherein the fuel cell reaction occurs over the electrode material on both the surfaces of the electrolyte plate.

144. The energy system of claim 125, wherein the reforming catalyst and the fuel electrode material are intermixed over the surface of the electrolyte plate to substantially simultaneously reform the fuel and create electrochemical reaction during operation.

145. The energy system of claim 125, wherein the combustion catalyst, reforming catalyst and the fuel electrode material are intermixed over the surface of the electrolyte plate to substantially simultaneously initiate partial oxidation and reformation of a fuel reactant and an electrochemical reaction.

146. The energy system of claim 125, wherein a hydrocarbon fuel introduced to the converter catalytically reforms in the presence of $H_2O$, the fuel to produce $H_2$ and CO said reformed fuel being subjected to a fuel cell reaction to form an exhaust species containing $H_2O$ and $CO_2$; wherein the heat from the exothermic fuel cell reaction is conductively transferred in-plane to the conductive plates to support the endothermic reforming reaction.

147. The energy system of claim 125, wherein a hydrocarbon fuel introduced to the converter catalytically combusts partially with $O_2$ to produce $H_2$ and CO, said partially combusted fuel being subjected to an exothermic fuel cell reaction to form an exhaust species containing $H_2O$ and $CO_2$, wherein the heat generated from the exothermic fuel cell reaction is conductively transferred in-plane to the conducting plates to provide a temperature sufficient to support the mild exothermic partial oxidation reforming reaction.

148. The energy system of claim 125, wherein a hydrocarbon fuel introduced to the converter catalytically combusts partially with $O_2$ in the presence of $H_2O$ to produce $H_2$ and CO, said partially combusted fuel being subjected to an exothermic fuel cell reaction to form an exhaust species containing $H_2O$ and $CO_2$, wherein the heat generated from the exothermic fuel cell reaction is conductively transferred in-plane to the conducting plates to provide a temperature sufficient to support the mild exothermic partial oxidation reforming reaction.

149. The energy system of claim 125, wherein the reactant includes at least one of an alkane (paraffin hydrocarbon), a hydrocarbon bonded with alcohol (hydroxyl), a hydrocarbon bonded with a carboxyl, a hydrocarbon bonded with a carbonyl, an alkene (olifin hydrocarbon), a hydrocarbon bonded with an ether, a hydrocarbon bonded with an ester, a hydrocarbon bonded with an amine, a hydrocarbon bonded with an aromatic derivative, and a hydrocarbon bonded with another organo-derivative.

150. The energy system of claim 125, wherein the converter is a fuel cell selected from the group consisting of solid oxide fuel cell, molten carbonate fuel cell, alkaline fuel cell, proton exchange membrane fuel cell, and phosphoric acid fuel cell.

151. The energy system of claim 125, wherein the electrolyte plate is composed of one of a zirconia based material, and a ceria based material, a bismuth based oxide, lanthanum gallate, molten carbonate or a composite of any of the foregoing materials.

152. The energy system of claim 125, further comprising reactant heating means disposed within one of the manifolds for heating at least a portion of at least one of said reactants passing through said manifold.

153. The energy system of claim 152, wherein said reactant heating means comprises a thermally conductive and integrally formed extended surface of said conductive plate that protrudes into at least one of said manifolds.

154. The energy system of claim 153, wherein said fuel cell reaction generates waste heat which heats said reactants to about said operating temperature, said waste heat being conductively transferred to said reactants by said interconnect plate and said extended surface.

155. The energy system of claim 125, further comprising peripheral exhaust means for exhausting the reformed fuel from a peripheral portion of the stacked plate assembly.

156. The energy system of claim 125, wherein at least one of the conductive plate and the electrolyte plate includes a reactant passage for allowing the reactant to pass from the axial reactant manifold over the surface of the plates.

157. The energy system of claim 156, wherein the reactant passage includes means for maintaining a substantially uniform pressure drop over at least one surface of the plates to provide for a substantially uniform flow of reactant over the plate surfaces.

158. The energy system of claim 156, wherein the reactive coating of the electrolyte plate is porous, the porous coating forming the reactant passage.

159. The energy system of claim 125, further comprising means for generating a reactant flow pressure drop through a space formed between the conductive plate and the opposing electrolyte plate that is substantially greater than the reactant flow pressure drop within the axial manifold.

160. The energy system of claim 125, further comprising means for producing a substantially uniform radial flow distribution of reactants through said stacked plates.

161. The energy system of claim 125, wherein the stacked plate assembly is cylindrical and at least one of the electrolyte plate and the conductive plate has a diameter between about 1 inches and about 20 inches, and has a thickness between about 0.002 inches and about 0.2 inches.

162. The energy system of claim 125, wherein said conductive plates conduct heat in the in-plane direction from one end region of the plate to the another.

163. The energy system of claim 125, wherein said electrolyte plate comprises a plurality of zones spaced along a surface of the plate for effecting selected reactions, said zones including a combustion zone, a reforming zone, and an electrochemical zone.

164. The energy system of claim 125, wherein said conductive plate forms a near isothermal temperature condition in-plane of said electrolyte and said conductive plates.

165. The energy system of claim 1, wherein said converter is adapted to receive electricity from a remote power source, said electricity initiating an electrochemical reaction within said converter which is adapted to reduce selected pollutants contained within the incoming reactants into benign species.

166. The energy system of claim 165, wherein the catalytic converter further includes means to receive exhaust containing selected pollutants, including NOx and hydrocarbon species, the catalytic converter including means for reducing the NOx and the hydrocarbon species into benign species, including one of $N_2$, $O_2$ and $CO_2$.

167. The energy system of claim 1, wherein the converter comprises a plate-type catalytic converter having a plurality of gas-tight converter plates having disposed on a first hydrocarbon gas side a reactive material consisting of one of a converter catalyst and a first electrode material; and disposed on a second buffer gas side a reactive material consisting of a second electrode material;

a plurality of gas-tight conductive plates formed of a thermally conductive material; said converter plates and said conductive plates being alternately stacked together LU form a converter assembly;

means for introducing a hydrocarbon gas to the hydrocarbon gas side of the converter plate and introducing a buffer gas to the second buffer gas side of the converter plate;

means for receiving electricity from a remote power source; and means for converting the hydrocarbon gas into benign species.

168. The energy system of claim 167, wherein the conductive plates include means for attaining a generally isothermal condition in-plane of the conductive plates.

169. The energy system of claim 167, wherein the converter plate is formed of a substantially gas tight electrolyte material.

170. The energy system of claim 167, wherein the converter plate is a gas tight ionic conductor.

171. The energy system of claim 167, wherein the electrode coatings of at least one side of the converter plate includes nickel or a nickel containing compound.

172. The energy system of claim 167, wherein the electrode coatings of at least one side of the converter plate includes platinum.

173. The energy system of claim 167, wherein the electrode coating of at least one side of the converter plate includes palladium.

174. The energy system of claim 167, wherein electricity received by said converter initiates an electrochemical reac tion which reduce selected pollutants within the hydrocarbon gas into the benign species.

175. The energy system of claim 167, wherein the assembly is adapted to receive exhaust containing selected pollutants, including at least one of NOx and hydrocarbon species, the catalytic converter further including means for reducing the NOx and hydrocarbon species into benign species.

176. The energy system of claim 1, wherein said converter or said thermal control stack comprises a stack of plates with axial manifold form therein, said system further comprises a tie-rod assembly for clamping the stack of plates together.

177. The energy system of claim 176, wherein the tie-rod assembly comprises at least one tie-rod axially mounted within the said manifold or external to the stack, and a pair of support plates mounted on opposite ends of the stack.

178. The energy system of claim 177, wherein tie rod is extended to reach a low temperature region where a spring load is applied to provide the clamping force.

179. The energy system of claim 177, wherein said converter comprises a fuel cell stack, and said tie-rod operates as an electrical connecting rod.

180. The energy system of claim 1, wherein the said converter or said thermal control stack comprises a gas-tight housing of cylindrical configuration configured to surround the said converter or stacks to permit pressurized operation.

181. The energy system of claim 1, wherein the converter and the thermal control stack are positioned interdigitally in a square or hexagon pattern.

* * * * *